(12) United States Patent
Guan et al.

(10) Patent No.: US 10,956,454 B2
(45) Date of Patent: Mar. 23, 2021

(54) PROBABILISTICALLY GENERATED IDENTITY DATABASE SYSTEM AND METHOD

(71) Applicant: Microsoft Technology Licensing, LLC, Redmond, WA (US)

(72) Inventors: Devin Guan, Monte Sereno, CA (US); Randy Cotta, Foster City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 16/141,229

(22) Filed: Sep. 25, 2018

(65) Prior Publication Data

US 2020/0175038 A1    Jun. 4, 2020

(51) Int. Cl.
*G06F 16/00* (2019.01)
*G06F 16/28* (2019.01)
*G06F 16/22* (2019.01)

(52) U.S. Cl.
CPC ........ *G06F 16/285* (2019.01); *G06F 16/2282* (2019.01); *G06F 16/288* (2019.01)

(58) Field of Classification Search
None
See application file for complete search history.

(56) References Cited

U.S. PATENT DOCUMENTS

| | | | | |
|---|---|---|---|---|
| 9,514,248 B1* | 12/2016 | Guan | ................ | H04L 29/06 |
| 2013/0282706 A1* | 10/2013 | Yoo | ................ | G06Q 30/02 |
| | | | | 707/723 |
| 2015/0067118 A1* | 3/2015 | Gatto | ................ | H04L 63/06 |
| | | | | 709/223 |
| 2015/0100426 A1* | 4/2015 | Hartzell | ................ | H04W 12/003 |
| | | | | 705/14.58 |
| 2015/0186636 A1* | 7/2015 | Tharappel | ................ | H04L 9/3231 |
| | | | | 726/8 |
| 2015/0235275 A1* | 8/2015 | Shah | ................ | G06Q 30/0269 |
| | | | | 705/14.66 |
| 2017/0235846 A1* | 8/2017 | Atlas | ................ | H04L 67/22 |
| | | | | 707/737 |
| 2019/0028371 A1* | 1/2019 | Palanciuc | ................ | H04L 63/104 |

* cited by examiner

*Primary Examiner* — Bai D Vu
(74) *Attorney, Agent, or Firm* — Schwegman Lundberg & Woessner, P.A.

(57) ABSTRACT

A storage device including an information structure produced by a method comprising: determining unique cluster names during a time interval; creating, in a storage device, one or more relationship tables, wherein for each unique cluster name, creating one or more relationship tables includes, creating one or more pairings that each includes an individual object identifier member of a cluster corresponding to the unique cluster name and includes a produced association score for the individual object identifier member, and wherein for each unique cluster name, creating one or more relationship tables includes creating a relationship between a unique key name that matches the unique cluster name and each of the one or more pairings created for the unique cluster name; and repeating the acts of determining and updating at selectable time intervals.

27 Claims, 29 Drawing Sheets

| Physical Device ID | PD Attribute A | ... | PD Attribute J |
|---|---|---|---|
| pd_1234 | Samsung | ... | Verizon |
| pd_2345 | Apple | ... | Verizon |
| pd_3456 | LG | ... | Vodafone |
| pd_4567 | Samsung | ... | Metro PCS |
| pd_5678 | HTC | ... | Metro PCS |
| pd_6789 | Apple | ... | AT&T |
| ... | ... | ... | ... |

FIG. 3

Relationship Table:

| User ID | Physical Device | Score |
|---|---|---|
| u_12 | pd_1234 | 10 |
| u_13 | pd_3133 | 10 |
| u_13 | pd_1111 | 2 |
| u_21 | pd_3412 | 10 |
| u_31 | pd_4343 | 8 |
| u_14 | pd_4567 | 7 |
| u_14 | pd_4621 | 4 |
| u_14 | pd_7811 | 2 |
| ... | ... | ... |

FIG. 4

Graph Contex Table:

| User ID | User Physical Devices |
|---|---|
| u_12 | {(pd_1234,10)} |
| u_13 | {(pd_3133,10), (pd_1111,2)} |
| u_21 | {(pd_3412,10))} |
| u_31 | {(pd_4343,8)} |
| u_14 | {(pd_4567,7), (pd_4621,4), (pd_7811,2)} |
| u_41 | {(pd_2167,10)} |
| ... | ... |

FIG. 5

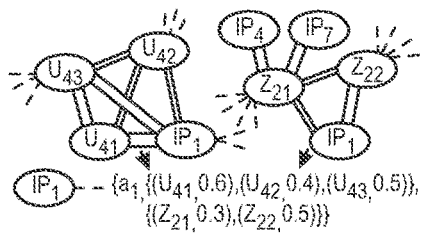

$IP_1 \sim \{a_1, \{(U_{41}, 0.6), (U_{42}, 0.4), (U_{43}, 0.5)\}, \{(Z_{21}, 0.3), (Z_{22}, 0.5)\}\}$

FIG. 6

IDB: Abstract/General Case...

| Type I Object | Type J Objects |
|---|---|
| obj_I14286 | {(obj_J01699, 2), (obj_J13490, 1)} |
| obj_I49216 | {(obj_J21571, 8)} |
| obj_I55135 | {(obj_J27065, 9)} |
| obj_I33106 | {(obj_J29300, 4), (obj_J24622, 3), (obj_J28104, 2)} |
| obj_I05607 | {(obj_J49810, 1)} |
| obj_I03097 | {(obj_J70715, 3), (obj_J59763, 3)} |
| ... | ... |

Graph Context Attribute Table

| Type J Object | Type I Objects |
|---|---|
| obj_J01699 | {(obj_I79553, 5), (obj_I14286, 2), (obj_I04924, 1)} |
| obj_J13490 | {(obj_I95513, 8), (obj_I22968, 7), (obj_I14286, 1)} |
| obj_J21571 | {(obj_I49216, 8), (obj_I91846, 6)} |
| obj_J27065 | {(obj_I55135, 9)} |
| obj_J29300 | {(obj_I33106, 4)} |
| obj_J24622 | {(obj_I87463, 4), (obj_I33106, 3)} |
| ... | ... |

Graph Context Attribute Table

| Type I Object | Type J Object | Score |
|---|---|---|
| obj_I14286 | obj_J01699 | 2 |
| obj_I14286 | obj_J13490 | 1 |
| obj_I49216 | obj_J21571 | 8 |
| obj_I55135 | obj_J27065 | 9 |
| obj_I33106 | obj_J29300 | 4 |
| obj_I33106 | obj_J24622 | 3 |
| obj_I33106 | obj_J28104 | 2 |
| obj_I05607 | obj_J49810 | 1 |
| ... | ... | ... |

Relationship Table

Type-I Keys → ← Type-J Keys

| Type I Object | Type I Object Attribute1 | ... | Type I Object AttributeN_I | Type J Object | Type J Object Attribute1 | ... | Type J Object AttributeN_J |
|---|---|---|---|---|---|---|---|
| obj_I14286 | $att_1^{I14286}$ | ... | $att_{N_I}^{I14286}$ | obj_J01699 | $att_1^{J01699}$ | ... | $att_{N_J}^{J01699}$ |
| obj_I49216 | $att_1^{I49216}$ | ... | $att_{N_I}^{I49216}$ | obj_J13490 | $att_1^{J13490}$ | ... | $att_{N_J}^{J13490}$ |
| obj_I55135 | $att_1^{I55135}$ | ... | $att_{N_I}^{I55135}$ | obj_J21571 | $att_1^{J21571}$ | ... | $att_{N_J}^{J21571}$ |
| obj_I33106 | $att_1^{I33106}$ | ... | $att_{N_I}^{I33106}$ | obj_J27065 | $att_1^{J27065}$ | ... | $att_{N_J}^{J27065}$ |
| obj_I05607 | $att_1^{I05607}$ | ... | $att_{N_I}^{I05607}$ | obj_J29300 | $att_1^{J29300}$ | ... | $att_{N_J}^{J29300}$ |
| obj_I03097 | $att_1^{I03097}$ | ... | $att_{N_I}^{I03097}$ | obj_J24622 | $att_1^{J24622}$ | ... | $att_{N_J}^{J24622}$ |
| ... | | | | ... | | | |

Basic Attribute Table / Basic Attribute Table

FIG. 7

IP Keys

Graph Context Tables...

| IP | IP Users |
|---|---|
| ip_12345 | {(u_12,0.2548),(u_13,0.1651),...} |
| ip_78982 | {(u_67,0.8278),(u_29,0.7419),...} |
| ip_65876 | {(u_18,0.6959),(u_84,0.4880),...} |
| ip_10965 | {(u_96,0.9599),(u_13,0.6628),...} |
| ip_94236 | {(u_51,0.4833),(u_84,0.4300),...} |
| ip_89745 | {(u_24,0.7350),(u_12,0.1347),...} |
| ... | ... |

Attribute Tables...

| IP ID | IP Attribute1 | ... | IP AttributeN |
|---|---|---|---|
| ip_12345 | 56 | ... | office |
| ip_78982 | 2 | ... | home |
| ip_65876 | 13 | ... | home |
| ip_10965 | 1 | ... | |
| ip_94236 | 401 | ... | office |
| ip_89745 | 4 | ... | home |
| ... | ... | ... | ... |

| IP | IP Zip11s |
|---|---|
| ip_12345 | {(zip_20697,0.0525), ...} |
| ip_78982 | {(zip_96855,0.0632), ...} |
| ip_65876 | {(zip_86064,0.3120), ...} |
| ip_10965 | {(zip_17913,0.3650), ...} |
| ip_94236 | {(zip_28863,0.9351), ...} |
| ip_89745 | {(zip_01006,0.9826), ...} |
| ... | ... |

Identity Query Basic Configuraton GUI:

General Settings
___

Continent/Countries [?]
Include

[ Enter continent/country to include (if none selected all are include) ]

Exclude

[ Enter continent/country to exclude(if none selected all are excluded) ]

Delivery Frequency [?]   Next DeliveryDate [?]   1356

One time Delivery ▼     19/26/2018 ▼ In GMT

Identifier Types [?]     Output Cookie Space [?]

All ▼                    Same as Input ▼

If you want to Output your Graph file in the same cookie Space as your input cookie space you have to appended Rest time Cookie / Device ID Sync Pixel to your web pages or add creative for at least 2 weeks You can find your sync pixel here Cookie and Device ID Amplification Setting Expand ▼

Precision and Recall Level [?]
Switch to Advanced mode
1360

| 28.61% Coverage% [?] | 290,918,400 connected consumers [?] | 4,026,242,985 IDENTIFIERS [?] |

1352

○══○══○══○══○══○
Precision           Recall

Graph Delivery Options
___

Graph File [?]

contd:
1350

  Identifier Attributes

Include the following Attributes in
the Device Attribute File

☐ Device Type
☐ Device Make
☐ Device Model
☐ Mobile Operator
☐ OS Type
☐ OS Version
☐ First Seen Timestamp
☐ Last Seen Timestamp
☐ Last Known Country
☐ Drawbridge Consumer ID ☐ Limited Ad Tracking [?]

Attribut File

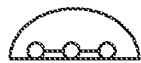 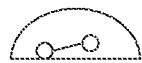 

FIG. 13A

General Settings

Continent/Countries [?]

Include

Enter Continent/Country to include (if none selected, all are included)

Exclude

Enter Continent/Country to exclude (if none selected, all are excluded)

Delivery Frequency [?]     Next Delivery Date [?]

One Time Delivery ▾       09/28/2018 ▾ in GMT

← 1452   Output Cookie Space [?]

Identifier Types [?]       Same as Input* ▾

All ▾
☒ Raw IDFA
☒ Hashed IDFA
☒ Connected TV
☒ GAID
☒ Hashed Android ID
☒ Cookies If you want to Output your Graph file in the same cookie Space as your input cookie space you have to appended Rest time Cookie / Device ID Sync Pixel to your web pages or add creative for at least 2 weeks You can find your sync pixel here etting

[Done]

Switch to Standard Mode

28.61%            290,918,400            4,026,242,985

COVERAGE% [?]    CONNECTED CONSUMERS [?]    IDENTIFIERS [?]

```
SELECT IP
    FROM IP_ USER_RELATIONSHIP
    WHERE Score>0.01
          AND User_id IN
      (
        SELECT User_id FROM
          (SELECT User_id, Physical_Device_ID
           FROM USER_PHYSICAL_DEVICE_RELATIONSHIP
           WHERE Score>0.6
          ) t1
        INNER JOIN
        (SELECT Identifier FROM CUSTOMER_44013_ID_LIST) t2
        ON t1.Identifier=t2.Identifier
      )
;
```

FIG. 14A

Week K:

Week K+1:

▷ Ties are broken randomly.

▷ Proposed names will be adopted as long as there are not multiple clusters vying for the same name.

▷ All names were initially generated as Naive names mem (1) = (1,1,1,1,1,0,0)
mem (2) = (1,1,1,1,1,0,0)
mem (3) = (1,1,1,1,1,0,0)
mem (4) = (1,1,1,1,1,1,1)
mem (5) = (1,1,1,1,1,1,1)
mem (6) = (0,0,0,1,1,1,1)
mem (7) = (0,0,0,1,1,1,1)

PROBABILISTICALLY GENERATED IDENTITY DATABASE SYSTEM AND METHOD

BACKGROUND

The Internet provides a communication network over which persons can exchange information using a wide variety of different devices. For example, a user may own a smartphone, a mobile tablet, a laptop computer. And a family of users can own a connected TV. As users work, socialize, research, and buy products across different Internet connectable devices, companies will continue to shift focus to reaching users and families more effectively across their multiple devices. Although a person may own and use different devices to communicate over the Internet, the relationship among different devices and users of the different devices is not readily apparent to outsiders such as companies seeking to understand and reach the person across his or her multiple devices.

A person may use different devices with different device identifiers, through network connection points associated with different network addresses, to communicate over the Internet. A person may communicate anonymously over the Internet without disclosing a personal identifier. A user may have multiple different email accounts and may participate in use of social media under different pseudonyms. Thus, there is no readily available solution to identify users using different devices accessing the Internet.

Similarly, a family online activity involves many different personal devices and shared devices, with a wide range of access points, different email accounts, and social media handles. There is no readily available solution to identify and analyze user-user, users-family relationship using different devices accessing the Internet.

BRIEF DESCRIPTION OF THE DRAWINGS

Some embodiments are illustrated by way of example and not limitation in the figures of the accompanying drawings.

FIG. 3 is an illustrative drawing representing an example relationship table database structure.

FIG. 4 is an illustrative drawing showing an example relationship table database structure.

FIG. 5 is an illustrative drawing showing an example graph context relationship table database structure.

FIG. 6 is an illustrative drawing representing a process to aggregate relationships in a graph structure to pairs that may be incorporated into a graph context relationship table.

FIG. 7 is an illustrative drawing representing a first example probabilistically generated IDB relationship table structures stored in non-transitory data storage.

FIG. 13A shows an illustrative configuration GUI to receive configuration input.

FIG. 13C shows and illustrative GUI menu that includes an identifier type dropdown menu to indicate object identifier relationships to search and retrieve.

FIG. 14A is an illustrative drawing showing a first example SQL pseudo-code representing a first example quality-controlled query.

DESCRIPTION OF EMBODIMENTS

Hierarchy of Object Identifiers

Figure 1:
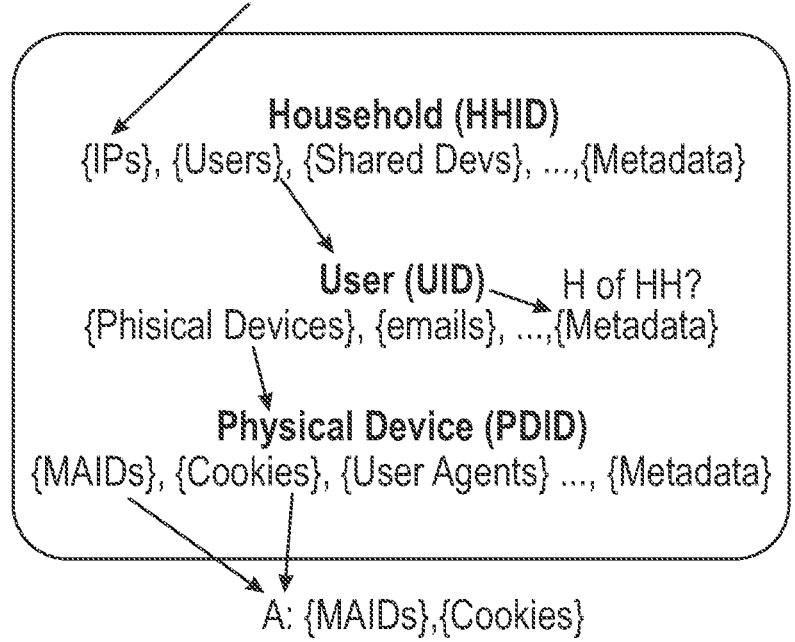
FIG. 1 is illustrative functional diagram of example a query requesting information from an object identity hierarchy stored in data storage of the IDB server.
Figure 31:
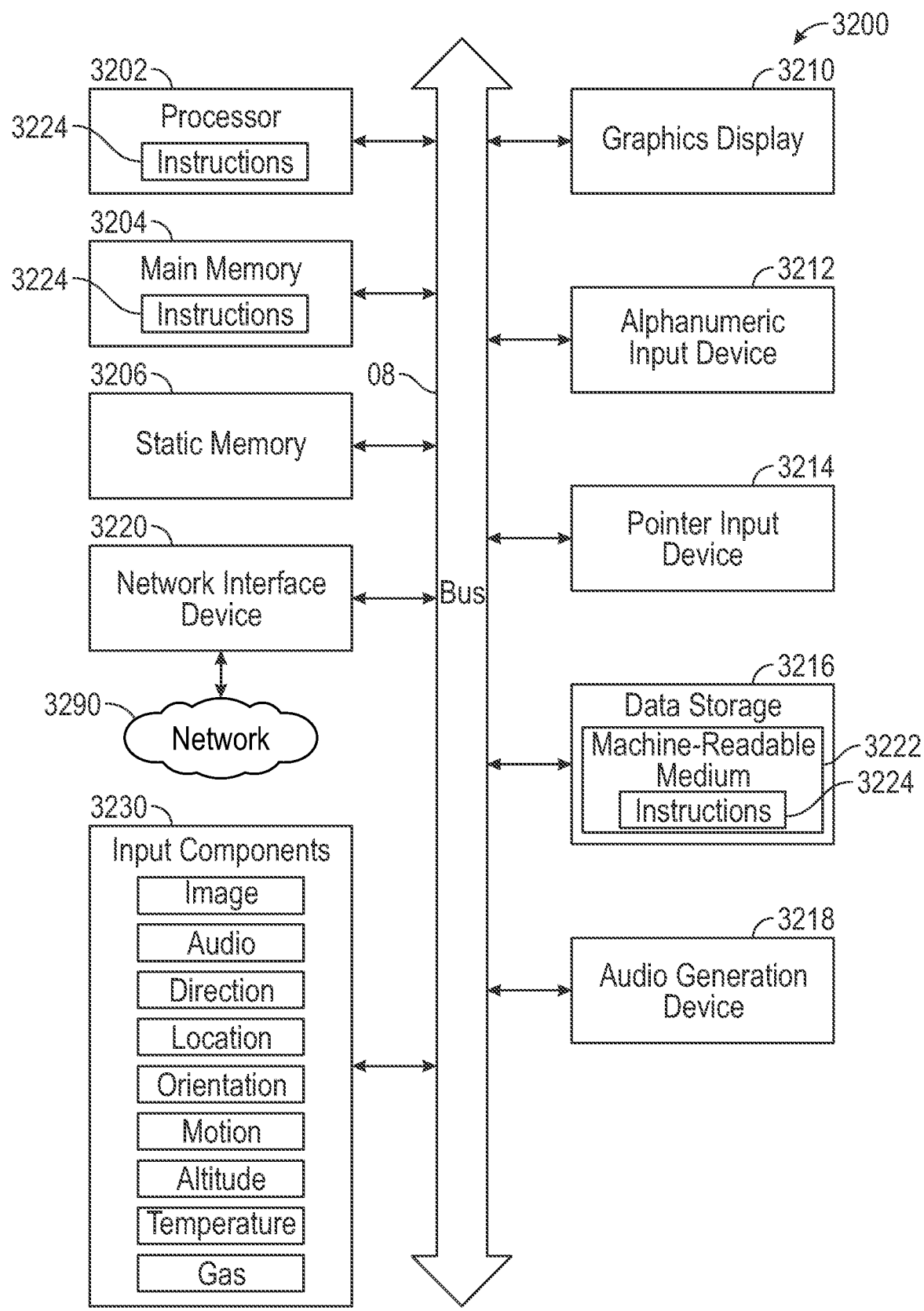
FIG. 31 is a block diagram illustrating components of an IDB server machine.

FIG. 1 is illustrative functional diagram of example a query requesting information from an object identity hierarchy stored in data storage of the IDB server 3200 of FIG. 31. A user may enter the query using the graphics display 3210 and input devices 3212, 3214 of a IDB creation and access server 3200 The example identity database (IDB) includes a hierarchy of object identifiers: household identifiers (HHIDs), user identifiers (UIDs), and physical device identifiers (PDIDs). HHIDs within the example IDB have hierarchical relationships with multiple UIDs. UIDs within the example IDB have hierarchical relationships with PDIDs. The identity database (IDB) server example receives a query input, which cascades through the hierarchy of object identifier hierarchy to provide an answer output. The example query request is, "Help me reach devices that are used by heads of household for households with our customer's IP addresses". In response to the example query request to reach heads of households having one of "our customer's IP addresses", the IDB creation and access server (IDB server) 3200 accesses one or more HHIDs having a customer IP address. The IDB server 3200 consults user-level metadata associated with HHIDs having a customer IP address, to identify users who likely to be heads of household. The IDB server 3200 identifies for the head of household users, one or more corresponding user identifiers (UIDs) related to identified HHIDs. The IDB server 3200 accesses the identified UIDs and identifies one or more physical device identifiers (PDIDs) and provides these as answers to the query. In the illustrative example, the provided answers include one or more of Mobile Advertising Identifiers {MAIDs} and {Cookies}, for example.

Objects, Attributes and Relationships

Object identifiers to identify objects referenced within an IDB. As used herein, the term 'objects' refers to entities that possess qualities that make them, through their object identifiers, suitable to act both as vertices of a graph structure and keys in a database structure. These qualities typically are characterized by high cardinality, such as potential relationships with many unique elements or with a large range of unique information. Objects generally may have many-to-many relationships with other objects. Objects, which are represented as object identifiers within the data storage 3216 of the IDB server 3200, preferably are natural reference points at which to collect attribute information and other data. Some objects are non-inferred, and some objects are inferred. Examples of non-inferred object identifiers include: Cookies, MAIDs, PDIDs, and IPs. Examples of an additional sub-class of non-inferred objects includes obfuscated personally identifiable information (PII) object identifiers, which include: email, zip 1 login, and truth handles. Examples of inferred object identifiers include: PDID, UID, and HHID. Inferred objects are derived/inferred from other objects. More particularly, objects may be probabilistically inferred generally as collections of other objects, which themselves may be probabilistically inferred.

As used herein, the term 'attributes' refers to descriptive classes of information that generally are not well suited to act as vertices of a graph structure and are not well suited to act as keys in a database structure. Attributes typically are characterized by low cardinality and may appear naturally as object metadata. Truth attribute examples include: gender, age, estimated income, etc. Examples of attributes include: gender, coarse geographic categories (like state, country or Zip-5), and other demographic estimates. Third party attribute examples include BK gender, IP-based geo, household estimated income, Maxmind IP type, etc.

As used herein, the term 'relationship' refers to an association between a pair of objects. Relationships typically are suitable to be scored, whether binary, ordered categorical or float-valued scores. (e.g., binary indications of association, probabilities coming from probabilistic models, discrete ordered or unordered categorizations, etc.) Relationships between objects also are referred to herein as 'pairs', which refer to pairs of objects. Examples of relationships include: ID-ID pairs, ID-IP pairs, User-User pairs, User-ID pairs, etc.)

Graph Structure Point of View

Figure 2:
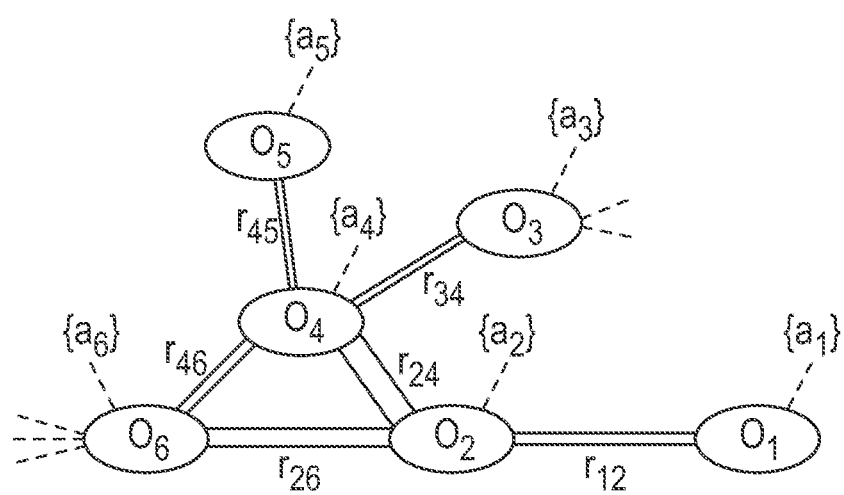
FIG. 2 is an illustrative drawing representing an example graph structure.

FIG. 2 is an illustrative drawing representing an example graph structure. The graph structure, which is stored in a non-transitory storage media such as a computer-readable memory device, includes vertices that represent object identifiers (e.g., $O_1$-$O_6$) and includes edges extending between objects that represent relationships between the objects. For example, a relationship $r_{12}$ between object identifiers $O_1$ and $O_2$ is represented as an edge between them in the graph. In the example graph, object identifiers are associated with attributes (e.g., $\{a_1\}$ or $\{a_6\}$) that provide descriptive information about their associated objects represented by the object identifiers. Edges are associated with weights (e.g., the value $r_{-12}$), which are often derived in part using the attribute information associated to the related objects, that indicate strengths of relationships between object identifiers.

Graphs are typically processed into discrete or fuzzy communities by applying crisp or fuzzy clustering algorithms. For example, the IDB server 3200 may derive clusters may resembling households by performing clustering on a graph whose vertices are User and IP-Address objects and whose edges represent association strengths between pairs of such objects based on their associated Attributes.

Similarly, the IDB server 3200 may derive physical devices upon clustering a graph composed of ephemeral identifier objects with scores based, for example, on the similarity of their associated user-agent strings. Thus, for example, in an example graph, objects include Device IDs; relationships include Device ID pair scores; and Attributes include user-agents.

For a graph representing IP-Zip-11, objects may include IPs and Zip-11s. Relationships are deterministic, supplemented with probabilistic based on user co-occurrences. As used herein on this context, 'deterministic' refers to edges are 'true edges' given to us by some authority, for example, who would know the probability. For example, the IP-Zip11 data may be provided by a commercial service provider such as a phone company or interne service provider; and the edge weight should be=1 (assuming interpreting the probability as an indication that the two are related).

Database Structure Point of View

FIG. 3 is an illustrative drawing representing an example relationship table database structure. The example table database structure, which is stored in a non-transitory storage media such as a computer-readable memory device, indicates relationships between object identifiers within a key index field column of the table database structure and attributes within unindexed columns of the table database structure. The example table database structure includes multiple logical columns and multiple logical rows. A key field column indicates object identifiers. Multiple attribute field columns indicate attribute information. Rows indicate relationships between object identifiers in the key field column and attribute information within the attribute field columns. Specifically, the example table database structure includes a key field column labeled, Physical_Device_ID and multiple example attribute columns labeled, PD_Attribute_A . . . PD_Attribute_J. Each row of the table database structure indicates relationships between a key value in the key field column intersecting the row and attributes of the attribute columns intersecting the row. For example, the third row indicates relationships between object identifier pd_4567 in the key field column and attributes Samsung . . . AT&T in the multiple attribute rows. As explained more fully below the object identifiers that act as index values and the attribute values within the example relationship table database structure are obtained from vertices and edges of an example graph structure (not shown).

Database Representations of Relationships Between Objects

FIG. 4 is an illustrative drawing showing an example relationship table database structure. The example relationship table, which is stored in a non-transitory storage media such as a computer-readable memory device, includes a pair of key index columns respectively labeled 'User ID' and 'Physical Devices' and a relationship score column labeled 'Score'. The User ID Thus, each row of the example relational table database structure relates a pair of keys and a relationship. The User ID key column includes object IDs that represent user objects and act as logical keys within a database. As explained below, in some example relationship tables, a user object is a probabilistically inferred object. The Physical Device object identifier column includes device object identifiers that represent device objects and act as logical keys within a database. As explained below, in some example relationship tables, a device object is a probabilistically inferred object. The Score column includes score values that indicate strength of relationship between a pair including a user object and device object. For example, the pair of objects, USER ID u_21 and Physical Device pd_3412, share a logical row in common with the relationship score value 10 which indicates strength of relationship between the pair. Similarly, USER ID u_31 and Physical Device pd_4343, share a logical row in common with the relationship score value 8 which indicates strength of relationship between the pair. Assuming, for example, that a larger relationship score indicates a stronger relationship, the object pair (u_21, pd_3412) has a stronger relationship to one another than the object pair (u_31, pd_4343). As explained more fully below the object identifiers that act as index values and the attribute values within the example relationship table database structure are obtained from vertices and edges of an example graph structure (not shown).

FIG. 5 is an illustrative drawing showing an example graph context relationship table database structure. The example graph context relationship table, which is stored in a non-transitory storage media such as a computer-readable memory device, includes a key index column labeled 'User ID' and an attribute column labeled 'User Physical Devices' which includes one or more pairs, each including an object identifier and a relationship score. Each logical row of the table includes a key index column that includes a User ID object identifier that identifies a user object and includes one or more pairs, each pair including a physical device identifier that identifies a physical device and a relationship score. The relationship score indicates a strength of relationship between the physical device of the pair and the user device identified in the same row. For example, the key index value USER ID u_13 is an object identifier has a strength relationship score value of 10 with physical device object identifier pd_3133 and has a relationship score 2 with physical device object identifier pd_1111. As explained more fully below the object identifiers that act as index values and the attribute values within the example graph context table are obtained from vertices and edges of an example graph structure (not shown). For example, within a graph structure (not shown) and each of the (Physical Device, Score) pairs, {(pd_3133, 10), (pd_1111,2)} indicates an object identifier related to u_13 by an edge (not shown) of the graph and a score associated with the edge. Specifically, for example a first edge (not shown) associated with score 10 connects USER ID u_13 with Physical Device pd_3133 in the graph, and a second edge (not shown) associated with score 2 connects USER ID u_13 with Physical Device pd_1111 in the graph.

FIG. 6 is an illustrative drawing representing a process to aggregate relationships in a graph structure to pairs that may be incorporated into a graph context relationship table. A portion of a first example graph structure, which is stored in a non-transitory storage media such as a computer-readable memory device, includes object identifiers $U_{41}$, $U_{42}$, $U_{43}$ and $IP_1$ connected by edges associated with the indicated scores. A portion of a second example graph structure, which is stored in a non-transitory storage media such as a computer-readable memory device, includes object identifiers $Z_{21}$, $IP_1$, $Z_{22}$, $IP_7$ and $IP_4$ connected by edges associated with the indicated scores. Relationships of $IP_1$ from the first and second graph structures are aggregated onto (object identifier, score) pairs within an attribute $\{a_1\{(U_{41}, 0.6), (U_{42}, 0.4), (U_{43}, 0.5)\}, \{Z_{21}, 0.3), (Z_{22}, 0.5)\}\}$. It will be appreciated that the aggregated relationship pairs may be used to populate a graph context table similar to that of FIG. 5, for example.

Overview of Representing Probabilistic Identities with Graph Structures and Database Structures Thus, as shown in FIGS. 2-6, graph structures and database structures both may be used to represent object identity relationships. Graph structures may be used to discover object identity relationships. Database structures may be used to organize identity relationships for accessibility. Object identity relationships discovered using graph structures may be used to populate the database structures. New information may be used to evolve graph structures over time to assimilate new identity relationships that may be discovered. Database structures may evolve correspondingly over time to accommodate newly discovered identity relationships.

Object identity relationships may be discovered probabilistically through graph structures. For example, the strengths of relationships between object identities within a graph structures are used as a basis to probabilistically infer the existence of other objects. In this way, a hierarchy of objects is created in which objects higher up in the hierarchy are inferred based upon the strengths of relationships among object lower in the hierarchy. Thus, in some examples, higher level objects in the hierarchy comprise collections of lower level objects in the hierarchy. More particularly, in some examples, objects defined at higher levels in an object hierarchy comprise collections of objects lower in the hierarchy that have the strong relationships among them.

The quality of object identity relationships discovered through graph structures may improve over time as more recent object relationship information is collected. However, the probabilistic nature of object identity relationships and the scoring that represents the strength of these relationships may result in a statistically noisy rather than a smooth evolution of graph structures toward greater accuracy. Additionally, dynamically changing object identity relationships over time, may require regular updating of graph structures not only to evolve an understanding of current object identity relationships, but also, to keep up with the changes in those relationships.

Probabilistic object identity relationships represented in database structures, through relationship scores for example, may be caused to evolve over time in concert with the ongoing probabilistic discovery of the object identity relationships through graph structures. The efficiency of the IDB server 3200 using database structures to represent probabilistic object identity relationships may depend upon the stability of the object identity relationships represented in the database structures. That stability may be impacted by ongoing discovery of object identity relationships that causes changes in object identity relationships represented in graph structures, which in turn, impels changes in object identity relationships represented in database structures.

EXAMPLE 1

Probabilistically Generated Identity Database

FIG. 7 is an illustrative drawing representing a first example probabilistically generated identity database (IDB) stored in data storage 3216 of the IDB server 3200. The example IDB includes two kinds of objects: Type-I objects and Type-J objects that act as two kinds of key indexes within the IDB. The Type-I objects and Type-J objects represent different ones of IPs, Users or Households, for example. As explained more fully below, each of the Type-I objects has a unique identifier that that matches the identifier determined for a temporally distributed identity object (TDIO) inferred through clustering. Similarly, each of the Type-J object has a unique identifier that that matches the identifier determined for a TDIO inferred through clustering.

The first example IDB includes a relationship table that relates pairs containing a Type-I object identifier and a Type-J object identifier. Each logical row includes a pair of key indexes each associated with a relationship score that indicates strength of relationship between the pair. More particularly, each row of the relationship table indicates a relationship between a pair including a Type-I object identifier and a Type-J object identifier and indicates a corresponding score indicating relationship strength.

The first example IDB includes an attribute table for the Type-I objects and includes an attribute table for the Type-J objects. Each logical row of the attribute table for the Type-I objects indicates relationships between a key index Type-I object identifier and its attributes. Each row of the attribute table for the Type-J objects indicates relationships between a key index Type-J object identifier and its attributes.

The first example IDB includes a graph context attribute table for the Type-I objects and includes a graph context attribute table for the Type-J object identifiers. Each logical row of the graph context attribute table for the Type-I objects associates a key index Type-I object identifier with one or more Type-J object identifiers with which it is related in a graph. Each Type-J object in a logical row is associated with a score that represents the strength of its relationship with the Type-I object in the row. Thus, for example, the top row of the graph context attribute table for the Type-I associates the object identifier pair (obj_I14286, obj_J01699) with relationship score 2 and also associates the object identifier pair (obj_I14286, J_13490) with relationship score 1. Likewise, each row of the graph context attribute table for the Type-J objects associates a Type-J object identifier with one or more key index Type-I object identifiers with which it is related in a graph. Each Type-I object in a logical row is associated with a score that represents the strength of its relationship with the Type-J object in the row. Thus, for example, the top row of the graph context attribute table for the Type-J associates the object identifier pair (obj_J01699, obj_I179553) with relationship score 5 and also associates the object identifier pair (obj_J01699, obj_I14285) with relationship score 2, and also associates the object identifier pair (obj_J01699, obj_I04924) with relationship score 1.

EXAMPLE 2

Identity Database

Figure 8:
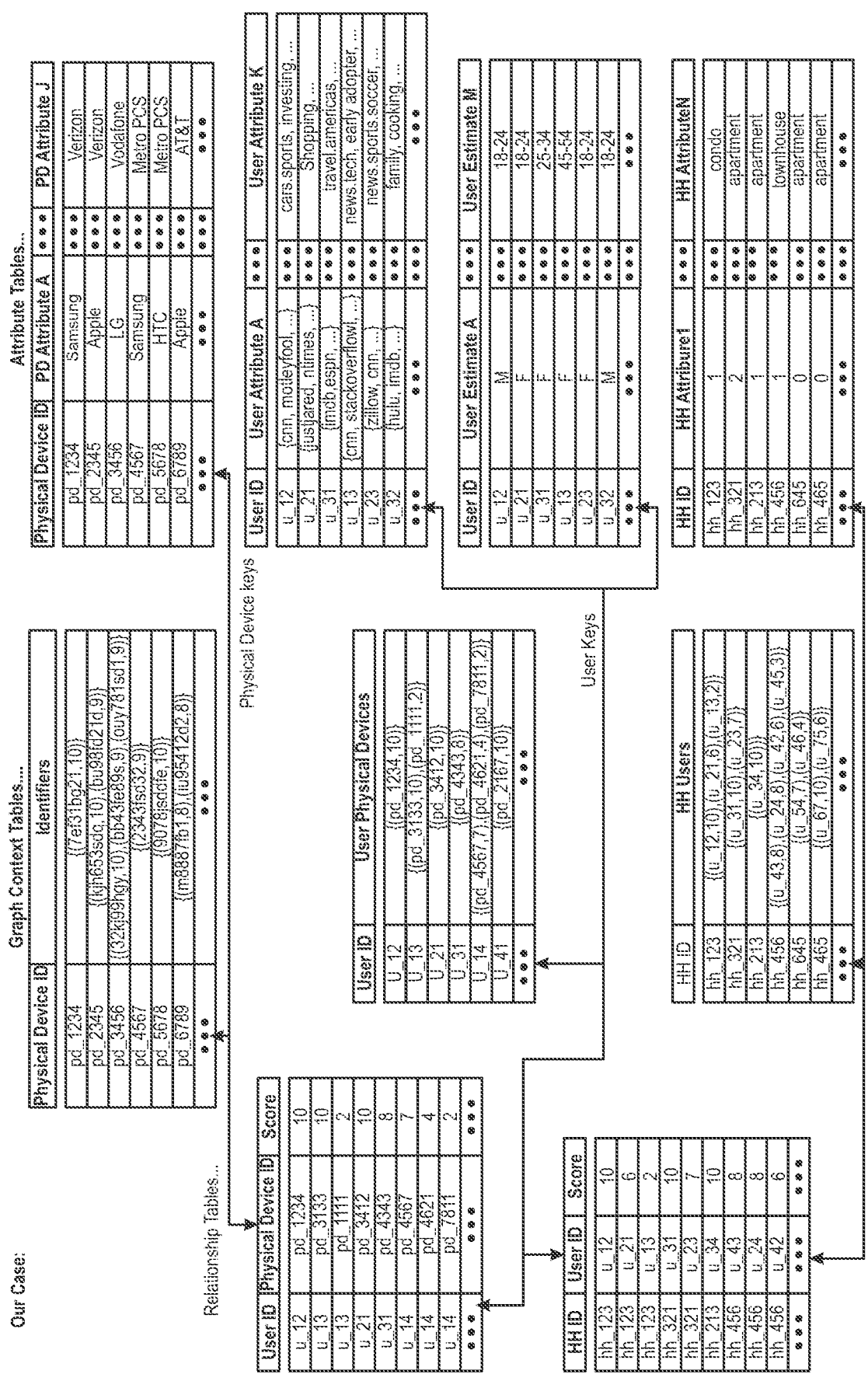
FIG. 8 is an illustrative drawing representing a second example IDB relationship table structures stored in non-transitory data storage.

FIG. 8 is an illustrative drawing representing a second example identity database (IDB). The second example IDB, which is stored in a non-transitory storage media such as a computer-readable memory device, includes three kinds of object identifiers: Physical Device IDs (PDIDs), User IDs (UIDs) and Household IDs (HHIDs) that act as three kinds of index keys within the PGIDB. Physical Devices (PDs), Users and Households (HHs) have hierarchically defined inferred relationship with each other. In some examples, an inferred HH is defined as a collection of Users; an inferred User is defined as a collection of PDs. As explained more fully below, each of the PDIDs, UIDs and HHIDs is a unique identifier that that matches the name determined for a temporally distributed identity object (TDIO) inferred through clustering.

The second example PGIDB includes a first relationship table structure that indicates relationships and corresponding scores for pairs of UIDs and PDIDs and includes a second relationship table that indicates relationships and corresponding scores for pairs of HHIDs and UIDs.

The second example PGIDB includes a first attribute table includes logical rows that indicate relationships between attributes and PDIDs. A second attribute table includes logical rows that indicate relationships between attributes and UIDs. A third attribute table that includes logical rows that indicate relationships between attributes and UIDs. A fourth attribute table includes logical rows that indicate relationships between attributes and HHIDs.

The second example PGIDB includes a first graph context table that for PDIDs, indicates relationships between and corresponding scores for one or more identifiers. In some examples, inferred PD identified with corresponding PDIDs are defined as collections of ephemeral identifiers, which include one or more of cookies and mobile advertising identifiers (MAIDs) of the advertising/marketing ecosystem and/or one or more of mobile device identifiers, television (TV) identifiers and IoT identifiers, for example. Referring the first graph context table, for example, the second logical row indicates associates the object identifier pair (pd_2345, kjh653sdq) with relationship score 10 and associates the object identifier pair (pd_2345, bu98fd21d) with relationship score 9. The second example PGIDB includes a second graph context table that for UIDs, includes logical rows that indicate relationships between one or more PDIDs and corresponding scores for one or more PDIDs. The second example PGIDB includes a third graph context table that for HHIDs, includes logical rows that indicate relationships between and corresponding scores for one or more UIDs. It will be appreciated that the first, second, and third graph context tables of the second example PGIDB in effect may act as graph-related attributes tables. In other words, each row of the first graph context tables relates a PDID with the one or more identifiers and corresponding scores that are associated in the graph with that PDID. Similarly, each row of the second graph context tables relates a UID with the one or more PDIDs and corresponding scores that are associated in the graph with that PDID. Each row of the third graph context tables relates an HHID with the one or more UIDs and corresponding scores that are associated in the graph with that HHID.

EXAMPLE 3

Identity Database

Figure 9:
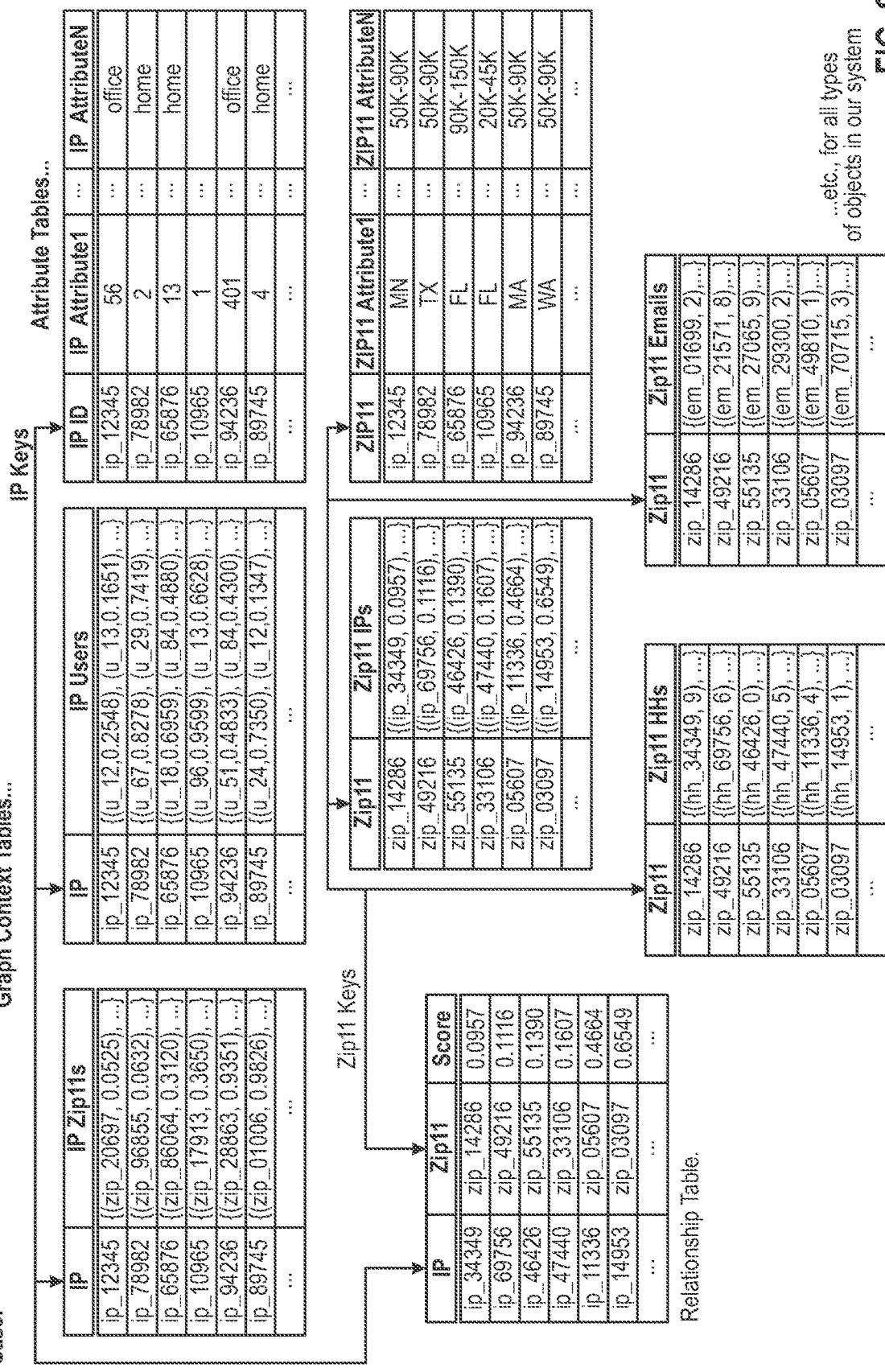
FIG. 9 is an illustrative drawing representing a third example IDB relationship table structures stored in non-transitory data storage.

FIG. 9 is an illustrative drawing representing a third example identity database (IDB). The third example IDB, which is stored in a non-transitory storage media such as a computer-readable memory device, includes five kinds of object identifiers: IP IDs (IPIDs), UIDs, Zip11 IDs (ZIP11IDs), HHIDs, and email IDs (EMIDs). In the third example IDB, the IPID and Zip11 ID object identifiers act as key indexes. In some examples, Physical Devices (PDs), Users and Households (HHs) have inferred hierarchical relationship with each other. In some examples, an inferred HH is defined as a collection of Users; an inferred User is defined as a collection of PDs. As explained more fully below, each of the IPIDs, UIDs, ZIP11IDs, HHIDs, and EMIDs is a unique identifier that that matches the name determined for a temporally distributed identity object (TDIO) inferred through clustering.

The third example IDB includes a relationship table that indicates relationships and corresponding scores for pairs of IPs and Zip 11s.

The third example PGIDB includes a first attribute table that includes logical rows that indicate relationships between IPs and attributes. A second attribute table includes logical rows that indicate relationships between ZIP11s and attributes.

The third example PGIDB includes a first graph context table that for IPIDs, indicates relationships between and corresponding scores for one or more UIDs. Referring the first graph context table, for example, the first logical row indicates associates the object identifier pair (ip_12345, u_12) with relationship score 0.2548 and associates the object identifier pair (pd_2345, u_13) with relationship score 0.1651. The third example PGIDB includes a second graph context table that for ZIP11s, indicates relationships between and corresponding scores for one or more IPs. The third example PGIDB includes a third graph context table that for ZIP11s, indicates relationships between and corresponding scores for one or more HHIDs. The third example PGIDB includes a fourth graph context table that for ZIP11s, indicates relationships between and corresponding scores for one or more EMIDs. It will be appreciated that the graph context tables of the third example PGIDB in effect may act as graph-related attributes tables.

Determination of Relationship Scores

Figures 10, 11A:
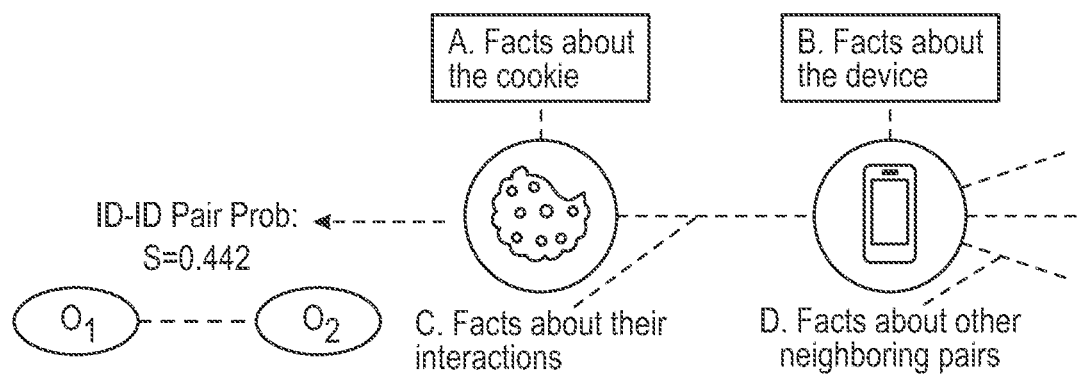
FIG. 10 is an illustrative drawing representing further example tables within a relationship table database.
FIG. 11A is an illustrative drawing representing a process to determine a pairwise relationship probability score.
Figure 11B:
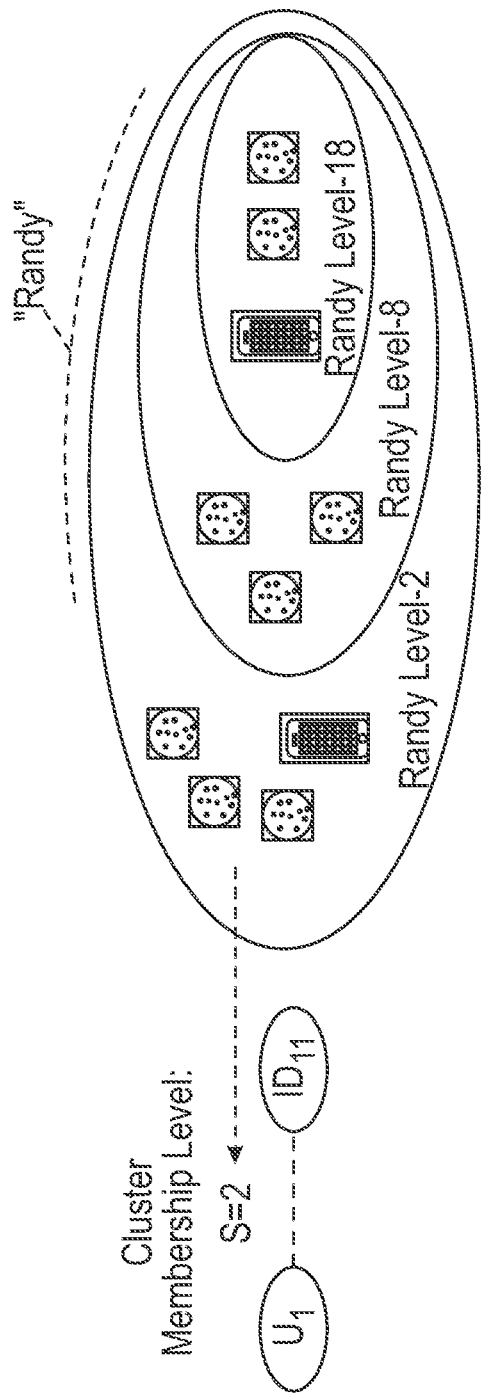
FIG. 11B is an illustrative drawing representing a process to determine cluster membership level scores based upon relationship score levels.
Figure 11C:
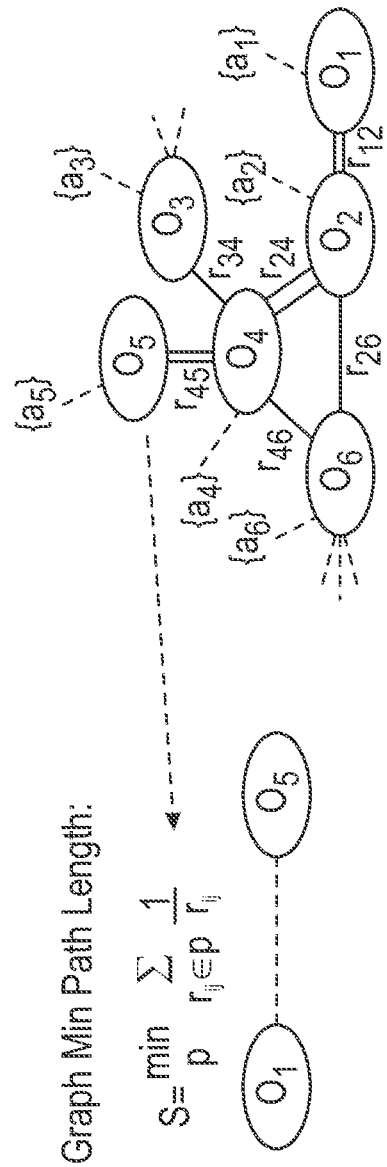
FIG. 11C is an illustrative drawing representing a process to determine cluster membership level scores based upon graph path lengths.

FIGS. 11A-11C are illustrative drawings representing alternative processes to score a strength of relationship between two example objects $O_1$ and $O_2$. The IDB server 3200 is configured to perform one or more of the scoring processes. The example scoring process of FIG. 11A involves determining a pairwise relationship probability score for $O_1$ and $O_2$. Object $O_1$ may be a Cookie and object $O_2$ may be a MAID, for example. A pairwise score for the relationship between $O_1$ and $O_2$ may be determined, for example, based upon facts surrounding $O_1$, facts surrounding $O_2$ and facts surrounding other objects (not shown) having pairwise relationships with $O_2$. The facts surrounding $O_1$, facts surrounding $O_2$ and facts surrounding other objects (not shown) are recorded at log servers (not shown) that log internet server requests at web servers (not shown), for example. These facts are processed into scores, for example, using supervised or unsupervised statistical learning techniques. Fact gathering through gathering observations and use of supervised or unsupervised statistical learning techniques to produce scores are disclosed in U.S. Pat. No. 9,514,248, entitled, System to Group Internet Devices Based Upon Device Usage", to Guan et al., which is incorporated herein in its entirety by this reference. In this example, the example pairwise relationship score is determined to be 0.442.

The example scoring process of FIG. 11B involves cluster membership level scores among multiple example cluster levels, (Randy, Level-18), (Randy Level-8), (Randy Level-2). Clusters of device identifiers may be associated with a user object, such as the user object with the object identifier "Randy". Levels of membership may be determined for device identifiers within the cluster for the user object identifier "Randy" based upon how strongly that device identifier is related to the other device identifiers of the cluster created for the user object identifier "Randy". For each device identifier, there is calculated a sum of the weights of edges connecting it to other device identifiers within the same cluster, subtracting the sum of weights connecting that device identifier to external device identifiers (e.g., device identifiers external to cluster "randy") A histogram is calculated of this statistic and scores are binned into decile bins. Each device identifier is then associated to its user "at Level L" where L is in $\{0, 1, \ldots, 9\}$. The example cluster "Randy" then can be denoted as having levels such as, "Randy" U41:{(ID12,3), . . . , (ID96,8)}. These "levels" can be characterized as association scores between a user cluster (e.g., "Randy") and the cluster's device identifiers.

The example scoring process of FIG. 11C graph path lengths. For example, a strength of relationship between object $O_5$ and object $O_1$ within a graph depends upon the scores associated with the relationships of objects in the graph on a path, comprising edges and objects, that connects $O_5$ and object $O_1$. In some examples a path-length based score is determined by finding the minimum cost path between two objects using the sum of the reciprocal of each weight along the path as the cost of traversing that path.

Temporally Distributed Inferred Objects (TDIOs)

Some of the object identifiers that are indexed within a probabilistically inferred database (IDB) and that also are used as keys within the IDB identify temporally distributed inferred objects (TDIOs) (e.g., UID, HHID). These object identities serve to name an underlying entity (e.g., a User) that causes a persistent organization of other objects over several versions of the data represented in the IDB. TDIOs reduce the amount of memory required to create and update an IDB, since they obviate the need to maintain a full-time-series of graph information for database. Advertising attribution is an example of a use case in which TDIOs are useful to achieve stable inferred object identity over a prolonged time period. That is, for example, TDIOs allow maintaining updated information for use-cases such as advertisement campaign attribution without requiring the memory storage to maintain a full time-series of graph information in the database over a full time-series period.

In advertising, for example, attribution is the practice of remembering over some period of time such as a month-long periods of time which users were exposed to certain marketing messages so that one can assign credit for given consumer actions (purchase, sign-up, lot-visit, etc.) to particular marketing exposure history in order to measure the impact/efficiency of marketing spend. To do this well, it is important to have a relatively stable user concept over this whole timescale so that the credit being assigned is accurately assigned. Recall that in some examples, user objects are inferred. User objects represented as TDIOs allow for stable inferred user object identities over an extended time duration. This result is achieved, for example, by incorporating 'memory' in IDB snapshots.

As explained more fully below, an example IDB creation server is configured to recurrently perform a graph creation/updating/clustering process to recurrently create and/or update one or more clusters of object identifiers at a succession of time intervals to provide up-to-date indications of clusters and their object identifier memberships. The example IDB creation server is configured to name each cluster (TDIO) with a unique TDIO name and names each object identifier member of the cluster with same unique TDIO name. The example IDB creation server is configured to cause storage in non-transitory storage media associations between object identifiers and their unique TDIO names. Thus, the names associated with object identifiers during one occurrence of a graph creation/updating/clustering can be used to generate clusters in a subsequent occurrence of graph creation/updating/clustering. In other words, the stored associations between unique TDIO names and object identifiers provides memory from one occurrence of graph creation/updating/clustering to the next of which object identifiers were previously clustered together within a common cluster. The storage of an association between TDIO names and object identifier members of a cluster having a matching TDIO name obviates the need to store full time-series graph information from one creation recurrence and/or graph updating recurrence to the next.

Referring again to the second example IDB of FIG. 8, each of the bolded items represent object identifiers identifying temporally distributed inferred object (TDIOs). The UIDs, PDIDs, HHIDs within the second example IDB identify TDIOs. The second example identity database also includes object that are not inferred such as the identifiers (e.g., 7ef31bg21), which may represent Cookies, for example.

IDB Relationship Scores and Quality Controlled Queries

The IDB creation server is configured to weight/score object relationships, which are stored as scores in relationship tables as explained above. As a result, an IDB in accordance with some embodiments may support queries with query-specified quality goals. The IDB server 3200 uses a score within a query to determine a precision/recall tradeoff, for example, in data returned from the IDB in response to the query. Thus, for example, a score within a query can specify statistical tradeoffs, such as selecting a point on the precision versus. recall curve or on the receiver operating characteristic curve (ROC). The ROC is a well-known statistical metric describing the rate of True Positives being returned, versus the rate of occurrences of False Positives being returned.

In some embodiments, the IDB creation server uses relationship scores to determines different 'level clusters' to represent different levels of object membership within an inferred object. A quality-controlled query specifies a score that determines the level cluster representation of an inferred object returned by the IDB access server from the IDB in response to the query. In some embodiments, an IDB supports fine-grained query quality control e.g. "I want all IPs that have ever been associated to devices that are strongly connected to this user". The IDB access server may interpret the "have ever been" requirement as a loose requirement on relationship strength requiring a lower relationship score. The IDB access server may interpret the "that are strongly connected" requirement as a strict requirement on relationship strength requiring a higher relationship score. Referring again to the second example IDB of FIG. 9, each table in the second PGIDB that relates TDIOs also includes a relationship score.

Thus, TDIOs are inferred. The TDIO identifiers are utilized within an IDB as keys to relationships with other object identifiers. The relationships may be with either other TDIO identifiers themselves (such as users or households), or with ordinary non-inferred objects (such as cookies or IP addresses, for example). Each relationship involving a TDIO identifier within the IDB is associated with a relationship score.

Example—Spectrum of Error Tolerance

Figure 12:
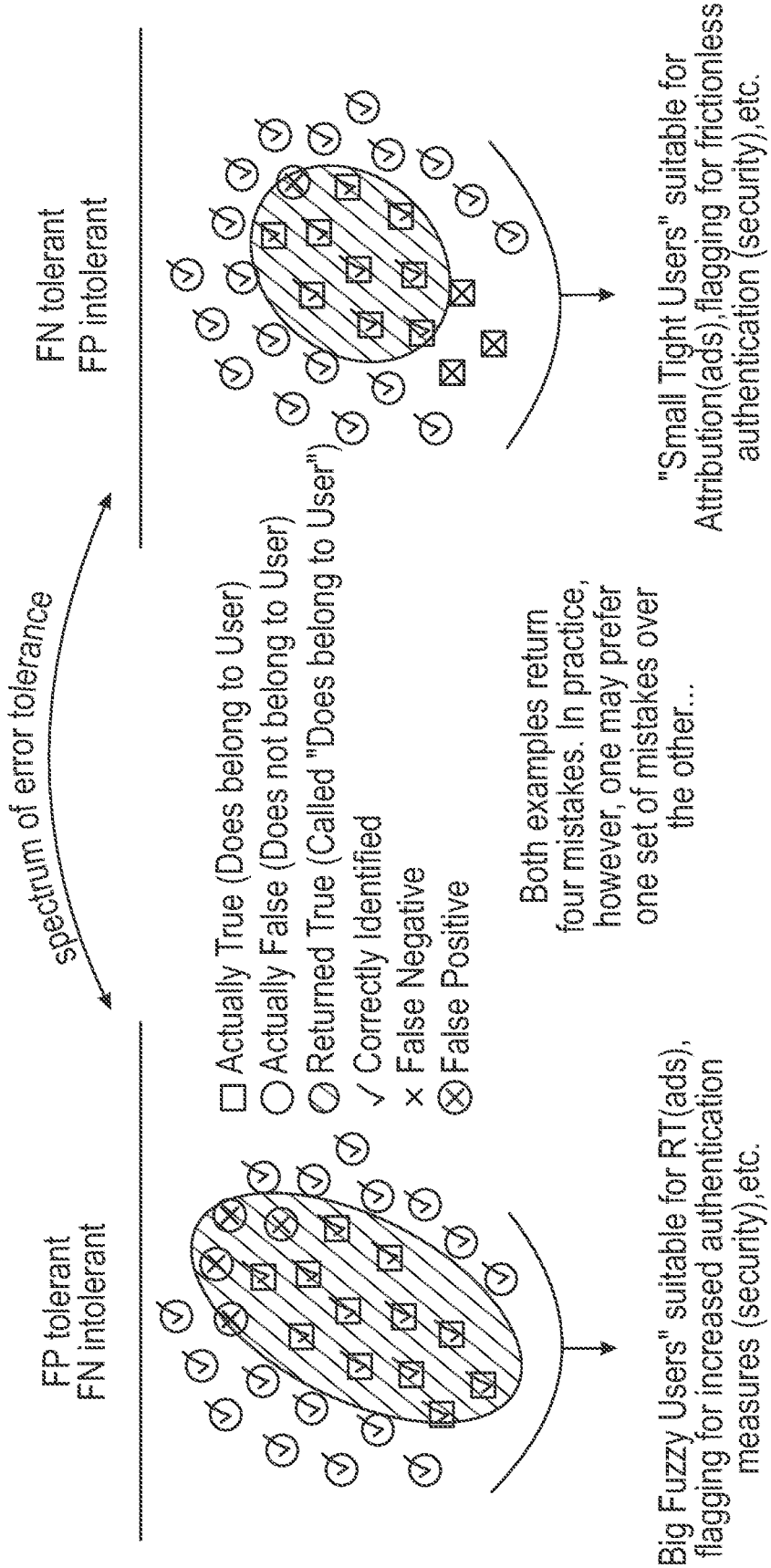
FIG. 12 is an illustrative diagram pictorially representing examples of query results at opposite ends of a spectrum of error tolerance that may be accessed by the IDB server upon querying an IDB containing TDIOs using queries with relationship scores.

FIG. 12 is an illustrative diagram pictorially representing examples of query results at opposite ends of a spectrum of error tolerance that may be accessed by the IDB server 3200 upon querying an IDB containing TDIOs using queries with relationship scores. The left and right images represent the same collection of objects. The shaded portion of the left image represents a query result boundary demarcating search results delivered in response to a query that is False Positive (FP) tolerant/False Negative (FN) intolerant. The shaded portion of the right image represents a query result boundary demarcating search results delivered in response to a query that is FP intolerant/FN tolerant. It is noted that the left and right query results both returns four mistakes. The query result represented in the left image contains four false positives. The query result represented in the right image contains three false negatives and one false positive. Thus, an IDB containing TDIOs and association scores may support different queries with different error tolerance profiles.

User Interface

Figure 13B:
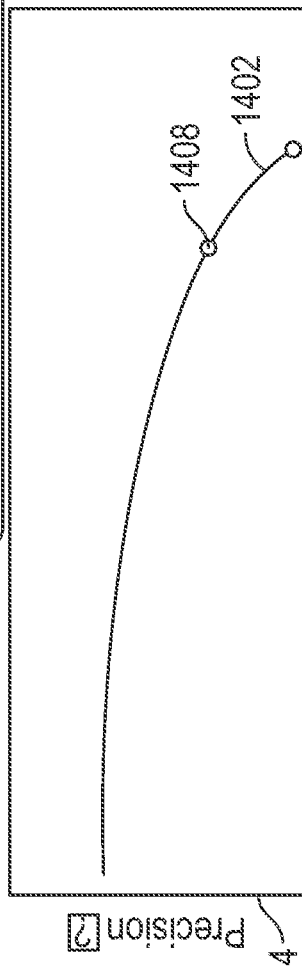
FIG. 13B shows an illustrative GUI that includes a graphical slider bar to select a location from among a range of different locations along a precision versus recall (PR) curve.
Figure 13D:
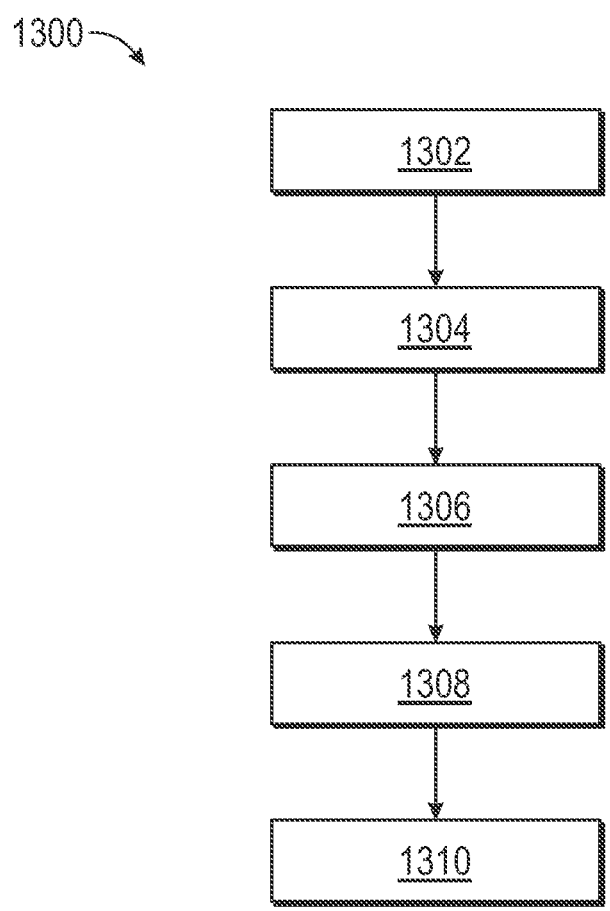
FIG. 13D is an illustrative flowchart illustrating operations of a method 1300 of using the GUI displays of FIGS. 13A-13C and relationship tables of an IDB to conduct a targeted search of a data set.

FIGS. 13A-13C are illustrative screen shot representations of an example set of graphical user input (GUI) system. FIG. 13A shows an illustrative configuration GUI to receive configuration input to specify a targeted search of the IDB. FIG. 13B shows an illustrative GUI that includes an advanced mode graphical actuator to select an error tolerance level for the targeted search results. FIG. 13C shows and illustrative GUI pop-up menu to select format for delivery of the targeted search results. FIG. 13D is an illustrative flowchart illustrating operations of a method 1300 of using the GUI displays of FIGS. 13A-13C and relationship tables of an IDB to conduct a targeted search of a data set. Operations in the method may be performed using machine components described below with respect to FIG. 31, using one or more processors (e.g., microprocessors or other hardware processors), or using any suitable combination thereof.

The GUI displays of FIGS. 13A-13C may be displayed on the graphics display 3210 of the IDB server machine 3200. A graphical actuator is configured to follow the contour of the slider bar in response to user actuation commands, which may be point-and-click-based or may be mouse-based, for example. An example GUI system includes a graphical actuator in the form of a graphical slider actuator that includes a graphical knob that follows a graphical slider track. In an example GUI system, the slider track is calibrated to a precision versus recall (PR) scale. Different knob locations along the slider correspond to different precision versus recall tradeoffs. A user moves the knob to a slider location to select a precision versus recall tradeoff. The user controls the graphical actuator by using the input devices 3212 and/or 3214 of the IDB server 3200.

A user uploads a dataset to the relationship tables of the IDB such as to the relationship tables of FIGS. 8-10. A user accesses the GUI configuration screen 1350 of FIG. 13A. The configuration screen 1350 includes a simple precision versus recall (PR) input 1352, a geography attribute input 1354 and a device attributes input 1356. A selection risk tolerance information actuates a graphical input inputs a tolerance level. The user may actuate a simple graphical actuator to select a PR level. Alternatively, a user may select a switch to advance mode input 1360 which causes a transition to the advanced mode graphical actuator screen 1400 of FIG. 13B.

The advanced mode graphical actuator screen 1400 includes a graphical slider track 1402 calibrated to a precision versus recall (PR) scale that includes a precision scale 1404 and a recall scale 1406 that are graphically arranged orthogonal to one another. Precision/Recall are calculated from FP, FN, TP, TN via well-known equations. A right-most limit of the graphical slider track arc 1402 corresponds to the FP tolerant/FN intolerant error tolerance level represented by the left image of FIG. 12. A left-most limit of the slider track arc 1402 corresponds to the FP intolerant/FN tolerant error tolerance level represented by the right image of FIG. 12. A graphical slider knob 1408 is configured to graphically slide along the graphical slider track 1402 in response to user input. Different locations on the graphical slider track correspond to different PR values. A user moves the graphical knob 1408 to a location on the graphical slider track that meets the user's PR tradeoff for a targeted search. The graphical knob 1408 location on the slider 1402 is used to create a search query based upon PR tolerance search Returning now to row configuration screen of FIG. 13A, a user may provide geographic attribute information at the geography attribute input 1354 to create a search query to indicate geographical locations to be targeted in the search. The example geography attribute input 1354 includes fields to enter geographic regions to include and geographic regions to exclude. A user may input device attribute information at the device attributes input 1356 to create a search query to indicate device attributes to be targeted in the search. The example device attributes include check box buttons to select different device attributes such as device type, device make, etc.

Referring now to the GUI pop-up menu 1452 of the third GUI screen 1450, there is shown a selection of example formats in which search results may be returned. The pop-up menu 1452 sets forth check box buttons in which to select formats. The example formats include RawIFA (Identity for Ads), ConnectedTV, etc.

Referring now to FIG. 13D, in response to user input to select a PR tolerance, operation 1302 causes a search of the UserId vs physical Device ID relationship table of FIG. 9 for UserId/Device ID pairs with a relationship score that corresponds to a PR tolerance specified by the user at PR tolerance input 1352 or 1408. As explained the relationship scores provide an indication of strength of relations between object identifiers. Similarly, a PR tolerance level indicates a tolerance level for level of relationship between a pair. Thus, for example, assuming that a user specifies a PR tolerance level that corresponds to a relationship score of 10 or more, then the pairs in the first, second and fourth rows meet the PR tolerance. At operation, 1304, the device attribute tables of FIG. 9 are searched for the devices of pairs that met the PR tolerance, for attributes that meet the attribute search requirements input at the device attributes input 1356. At operation 1306, geography attribute tables of FIG. 10 are searched for the devices of pairs that met the PR tolerance, for attributes that meet the geography search requirements input 1354. At operation 1410, the deviceIDs that satisfy the PR tolerance and meet the device attribute requirement and the geography requirement are retrieved from the IDB and formatted according to the formats selected at the pop-up menu 1452 of the screen 1450 of FIG. 13C and for delivery to or on behalf of the user.

Example—Quality Controlled Queries

FIG. 14A is an illustrative drawing showing a first example SQL pseudo-code representing a first example quality-controlled query. In this two-part query, a first selection involves identification of UIDs with relationships to device IDs and selecting UIDs that have relationships with devices that are stronger than 0.6. A second selection involves identification of IPIDs that have relationships with the identified UIDs that are stronger than 0.1.

Figure 14B:
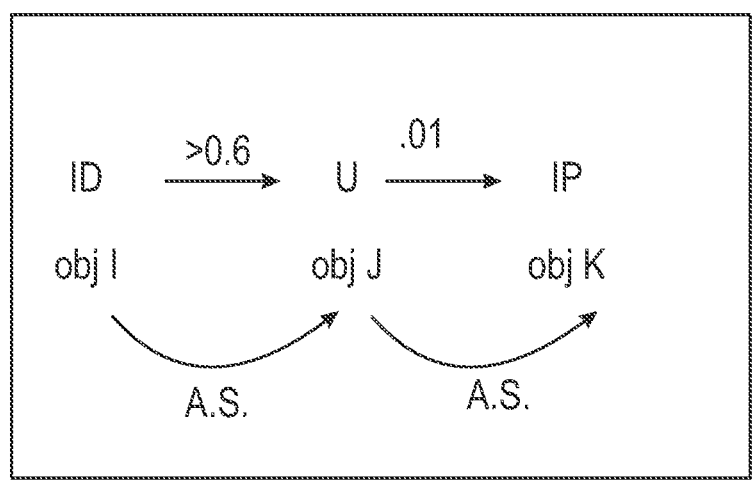
FIG. 14B is an illustrative flow diagram representing flow of execution of the first example SQL pseudo-code.

FIG. 14B is an illustrative flow diagram representing flow of execution of the first example SQL pseudo-code. The first selection involves a selection of objects J (e.g., UIDs) that have relationships with objects I (e.g., device IDs) with relationship scores greater than 0.6. The second selection involves selection of objects K (e.g., IPIDs) that have relationships with selected object Js (e.g., UIDs) with relationship scores greater than 0.1. Thus, the first selection requires stronger relationship scores than the second selection.

In more informal terms, the first example quality-controlled query of FIGS. 14A-14B may be interpreted as requesting all IPs that have ever been associated to users who very likely owned certain user devices. In this example, the "all users" constraint is quantified by the probability greater than 0.1 requirement. In this example, the "likely owned" constraint is quantified by the probability greater than 0.6 requirement.

Example First Clustering Process Without TDIO Naming Logic

Figure 15:
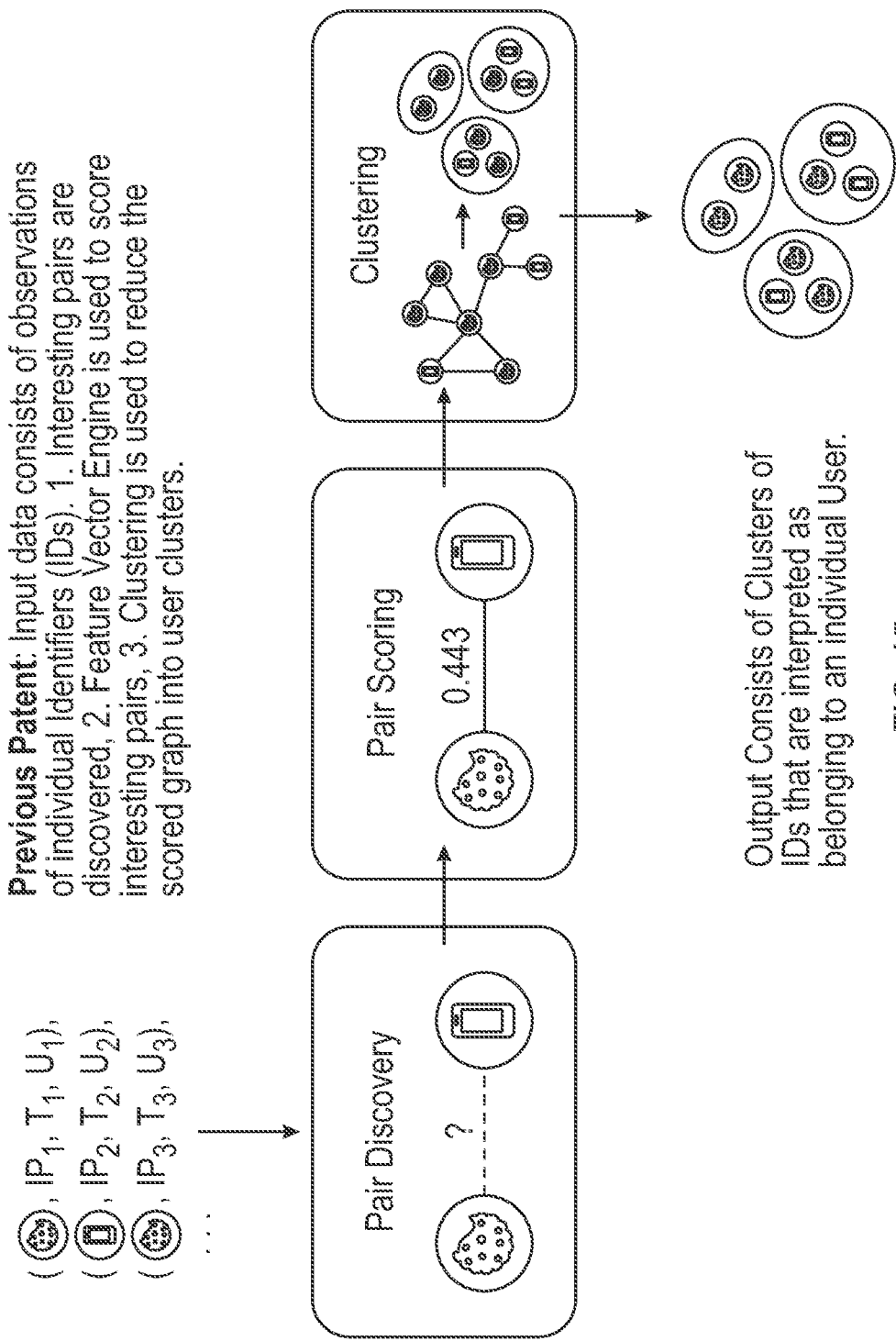
FIG. 15 is an illustrative example functional flow diagram representing a first clustering process to cluster identifiers belonging to individual users.

FIG. 15 is an illustrative example functional flow diagram representing a first clustering process to cluster identifiers belonging to individual users. The IDB server 3200 includes one or more processors 3202 that may be configured according to program instructions to perform the first clustering process. Statistical properties of network observation data that represent events observed on a network are used to identify interesting pairs of device identifiers. For example, in some situations, pairs which have greater than some minimum likelihood to be associated to the same user are 'interesting'. For example, if a simple model can tell us that there is less than a 1/10,000 chance that the objects in this pair are owned by the same person, then we do not want to spend the resources required to more fully consider this pair further, that is the sense in which we might say the pair is 'uninteresting'. In some examples, a network observation data includes a client device identifier (e.g., MAID, ($D_n$), web cookies and MAIDs) of a client device operating on a network, a network source/destination address identifier (e.g., an IP address) accessed by the client device, and a timestamp indicating a time at which the client device accessed the network at the identified network source/destination address. The '248 patent, which is incorporated herein by reference discloses observations that include network triad data. It is noted that in this example, the example input data triads include non-inferred $D_n$s, cookies and MAIDs within an advertising ecosystem. However, network observation data also may include inferred (TDIO) objects and non-inferred objects. The example of FIG. 15 includes example data triads that include a network address ID ($IP_n$), a time stamp ($T_n$), a device ID ($D_n$) and additional information associated with an observed event ($U_n$). Often, the additional information includes a URL or a software application associated with an observed event. The additional information such as a URL/App involved or various other facts that may be passed along in the event.

The illustrative example shows, a first cookie associated with the network observation data ($D_1$, $IP_1$, $T_1$, $U_1$); a mobile phone associated with the network observation datas ($D_2$, $IP_2$, $T_2$, $U_2$); and yet another cookie associated with the network observation data ($D_3$, $IP_3$, $T_3$, $U_3$). In a second scoring step, a feature vector engine is used to determine a pair association scores for the interesting pairs. In a third clustering step, clustering is used to reduce a graph with pair association scores between vertices developed based upon the pairing and scoring steps, into clusters of identifiers to produce multiple output clusters, each associated with a different user ID. The example output clusters of FIG. 15 include a first cluster that includes as members, client device object identifiers representing two cookies and one device ID; a second cluster that includes as members, client device object identifiers for two cookies; and a third cluster that includes as members, client device object identifiers for two MAIDs and one cookie. In some embodiments, each output cluster includes client device object identifiers of client devices owned by a different user, and therefore, each cluster infers a different user object. Thus, the client device object identifiers within each cluster may be used as a basis to infer a user object associated with that cluster even though the actual identity of the user remains unknown (i.e., the association of a given such cluster with a particular underlying user cannot be determined without more information). The '248 patent discloses a system and method to perform the process of FIG. 15.

Example Second Clustering Process With TDIOs

Figure 16:
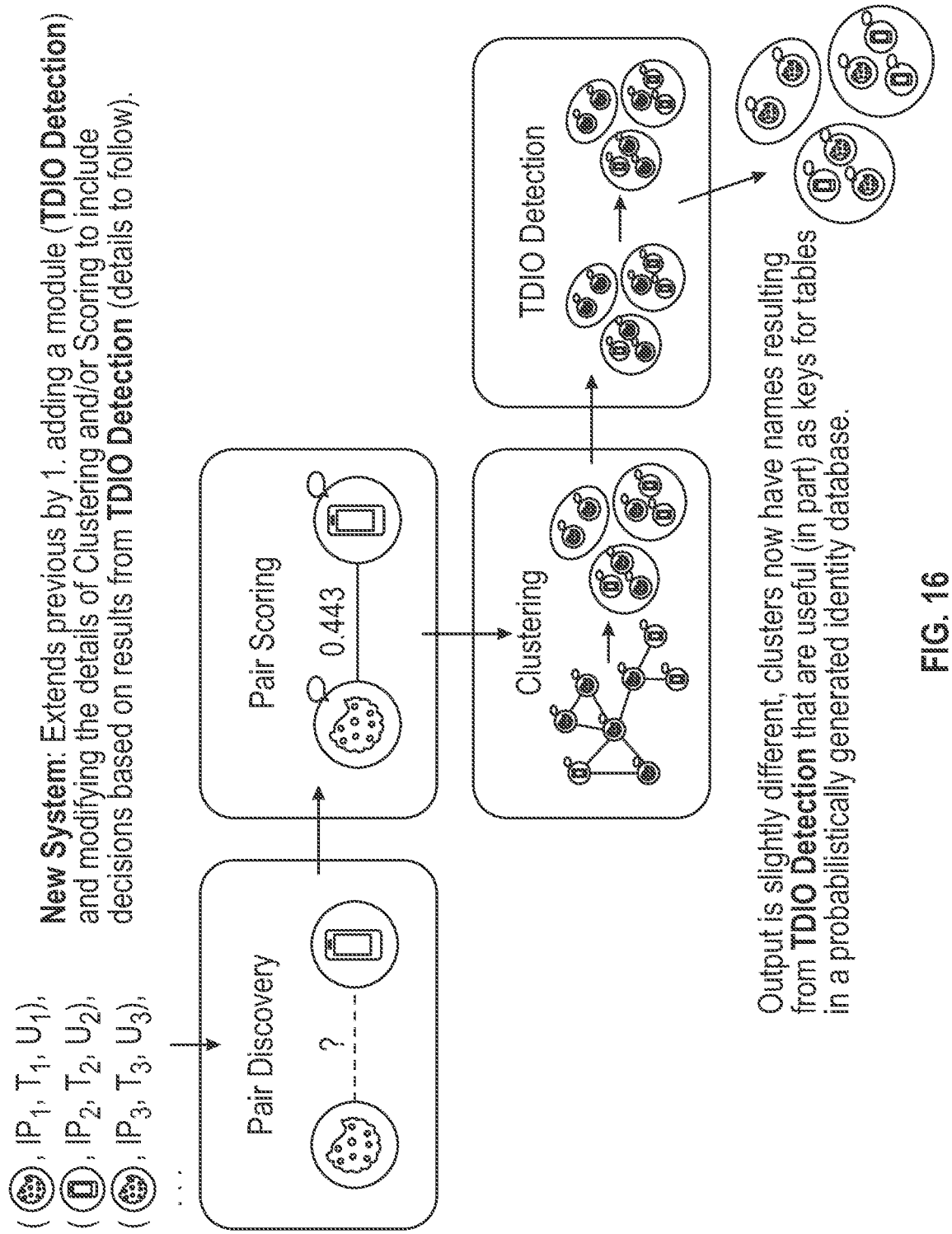
FIG. 16 is an illustrative example functional flow diagram representing a second clustering process, including TDIO detection, to cluster identifiers belonging to individual users.

FIG. 16 is an illustrative example functional flow diagram representing a second clustering process, including TDIO detection, to cluster identifiers belonging to individual users. The IDB server 3200 includes one or more processors 3202 that may be configured according to program instructions to perform the second clustering process. The pair discovery and scoring operations and the clustering operation are configured to take into account stored TDIO identifiers during at least one of the scoring operation and the clustering operation. The pair scoring and pair clustering proceed generally as disclosed in the '248 patent modified to take into account stored TDIO identifiers during at least one of the pairing, scoring or clustering operations. The second example clustering process includes a fourth TDIO detection operation. In the example second cluster process shown in FIG. 16, the fourth TDIO operation receives the clusters created at the third cluster creation operation and uses a naming process described below to name the received clusters and the member object identifiers within the received clusters.

Still referring to FIG. 16, the clusters and object identifiers received by the fourth operation, TDIO detection, are labeled with names. An example first cluster produced by the third operation, clustering, includes a cookie object identifier member named blue and a mobile advertising identifier (MAID) object identifier members named red and; the second cluster produced by the third operation includes two cookie object identifier members named green; and the third cluster produced by the third operation includes two MAIDs object identifier members named blue and one cookie object identifier members named blue. It will be appreciated that although the example in FIG. 16 shows each object identifier member of a cluster having an associated name, in other examples (not shown), some object identifiers may not yet have received names.

The fourth operation, TDIO detection, names each received cluster and each object identifier member within each received cluster according to a naming process described more fully below with reference to FIGS. 18A-18B. More particularly, the fourth operation, TDIO detection, names each received cluster with a different unique name and names each object identifier member within each cluster with a unique name that matches the unique name of the cluster that contains it. The fourth operation, TDIO detection, therefore, outputs the received clusters uniquely named such that each cluster has a different name and all MAIDs within a cluster are named to have the names that match the name of the cluster in which it is a member. In other words, the fourth operation, TDIO detection, determines a unique name for each cluster and uses the name to name the cluster and each object identifier member within the cluster.

The second clustering process of FIG. 16 may be performed repeatedly over the course of multiple successive time intervals to garner, at each recurrence of the performance, new pairing, scoring, clustering, and TDIO information and to update previously determined pairing, scoring, clustering, and TDIO information. The reason for performing the second clustering process repeatedly is to observation data and to update the clusters over time. So, for example, the IDB server 3200 includes one or more processors 3202 that may be configured to run the second clustering process once, waits for a user selectable time delay such as one day or one week so that additional data may be collected at one or more log servers. After the time delay, the one or more processors 3202 run the second process again. It will be appreciated that even if cluster results had one hundred per cent accuracy after the first run, for example, there still is a need to repeat the second process at a succession of intervals to observe and place newly created objects/object identifiers into appropriate clusters.

As explained more fully below, the names associated with the object identifiers that are determined at a given run or performance of the second clustering process are stored in association with the object identifiers that they name so that they act as 'previous' names of the object identifiers in a next successive performance of the second clustering process. As explained more fully below with reference to FIGS. 18A-18B, in some examples of the second clustering process, the second operation, scoring, determines pair association scores based at least in part upon stored previous object identifiers names determined by the fourth operation, TDIO detection, during a previous run of the process. Moreover, as also explained more fully below with reference to FIGS. 18A-18B, in some examples of the second clustering process, the third operation, clustering, determines clustering based at least in part upon stored previous object identifiers names determined by the fourth operation, TDIO detection, during a previous run of the process.

The fourth operation, TDIO detection, uses stored previous object identifiers names determined by the TDIO detection during a previous run of the process, as a basis for determining matching unique names for clusters and their object identifier members. In some examples, the naming process includes leaving names unchanged from one run of the second clustering process to the next, generating new names or renaming previously named object identifiers. Moreover, as explained more fully below, the IDB server 3200 includes one or more processors 3202 that may be configured to run the TDIO naming process with a bias to generally leave cluster labels unchanged from one run of the second clustering process to the next.

In an example of the second clustering process, one or more of the pairing, scoring and clustering operations uses previously determined stored object identifier names in a way such that names of clusters created during a subsequent performance of the second clustering process are largely consistent with previous naming of the clusters during a previous performance of the second clustering process. More particularly, one or more of the pairing, scoring and clustering operations uses rules as the basis, respectively, for pairing, scoring, or clustering such that names of clusters created during a subsequent performance of the second clustering process are largely consistent with previous naming of the clusters during a previous performance of the second clustering process. As explained more fully below, this consistency in naming clusters during successive runs of the second clustering process contributes to stability and persistence of key index names within database relationship tables. In other words, a unique key name within a relationship table that matches a unique key name of a cluster created by the second clustering process remains stable over multiple time intervals despite the possibility of changes in object identifier membership within the cluster with the matching unique cluster name. Thus, unique key names within a relational table remain stable over time even if related object identifiers within the same logical row of relationship table change over time.

Thus, it is desirable that keys remain 'stable' in the sense that i) they tend to keep re-appearing in the clustering result and thus the IDB and ii) they tend to have the same object identifier and attribute constituents over time as well. This means that if cluster X is made up of object identifiers a,b,c,d one week, it is likely that object identifiers a,b,c,d are likely to reappear together the next week in a cluster named X. Note that there is no problem generalizing this to the fuzzy case, you can just say that if a,b,c,d have a strong membership to cluster X one week, then they are likely to have a strong relationship to cluster X in the next week.

Referring to the first cluster produced by the clustering operation, there are two object identifiers named red and one object identifier named blue. The differently named object identifiers within the first cluster at the cluster producing operation suggests that during a prior run of the second example clustering process, the object identifier named blue was not a cluster member within the first cluster. In other words, the object identifiers of the first cluster at the cluster producing operation were cluster members of a cluster that the TDIO operation named as red in a previous run, but in the current run, the clustering operation is adding another object identifier previously named as a cluster member of a different cluster (not shown) that had been named blue. In the example second clustering process, the fourth operation, TDIO determination, changes (relabels) the object identifier in the first cluster that it receives from the clustering operation from the name blue to the name red such that all object identifiers of the first cluster and the first cluster that contains them are named as red. As will be understood from the explanation below, with reference to FIGS. 18A-18B, the naming process recognizes that since all members of the first cluster output by the TDIO operation in a previous run of the second example clustering process were named as red, the (naming process renames the object identifier named blue to become named red to become consistent with the naming of the other previously added members of the first cluster that is output by the TDIO determination operation in the current run.

Referring now to the second operation, pair association scoring, of the example second clustering process of FIG. 16, it can be seen that an object identifier for cookie named red is paired with an object identifier for a mobile phone named blue. From the discussion above, it will be appreciated that the different names associated with the pair signifies that in a previous run of the example second clustering process the cookie named red and the mobile phone named blue were members of different clusters, which the fourth operation, TDIO determination, previously had named red and blue, respectively. Moreover, in this current run of the example second clustering process the third operation, clustering, clusters the object identifier for cookie named red and the object identifier for a mobile phone named blue within the first cluster. As explained above, the fourth operation, TDIO determination, renames the object identifier named blue to become named red.

Thus, the naming process of the fourth step, TDIO determination, adjusts object identifier names in response to newly discovered information about relationships (e.g., pairings) between the objects identified by object identifiers. The naming process of the fourth operation, TDIO determination, adapts object identifiers names to match names determined for clusters to which the clustering operation assigns the object identifiers as members such that all object identifiers within a cluster and the cluster itself have a unique matching name. Moreover, in adapting object identifier names of a newly added member of a cluster to match the name associated with previous members of the cluster, the naming process of the fourth, TDIO determination, contributes to maintaining the continuity of object identifiers within a previously named cluster.

It will be appreciated that iTDIO naming works in concert with consideration of TDIOs in pairing/scoring/clustering operations tend to maintain continuity of member object identifiers within a cluster. Naming alone only guarantees that named object identifiers do not tend to be re-named to something else from one week to another.

In some examples of the second clustering process, there are two threads of continuity. First, after clusters are created the TDIO naming process is performed in such a way as to maintain the continuity in how the object identifiers are named (as many as possible will not have to change their names from one run to the next). Second, given the pairing/scoring/clustering operations are acting based in part on a knowledge of previous TDIO names (a TDIO memory), a cluster's constituents (the collection of object identifier members that make up a cluster) are largely the same (continuous) over time.

In accordance with some examples of the second clustering process, one or more of the pairing/scoring/clustering operations of the second example clustering process may include a TDIO name-based clustering rule that determines clustering based in part upon number of differently named object identifiers within a given cluster. For example, the clustering operation may include a TDIO name-based rule that aims to limit the number of differently named MAIDs within a cluster. Thus, in some embodiments, TDIO names may be used as a basis for determine cluster members at the clustering operation.

Some examples of the second clustering process employ a community detection algorithm, such as the Louvain algorithm in which one optimizes a local quantity such as the well-known "modularity" quantity. One could instead sum the usual modularity plus a function which grows with the number of cluster constituents whose previous TDIOs agree. Therefore, the optimal clusters produced by such algorithm optimize a combination of modularity (representing responsiveness to the latest data) and TDIO consistency (representing temporal consistency or "temporal smoothness"). See, (http://iopscience.iop.org/article/10.1088/1742-5468/2008/10/P10008/meta), Algorithms balancing this kind of combination of objectives were first investigated in works which coined the term "Evolutionary Clustering". See, (https://dl.acm.org/citation.cfm?id=1150467) Persons skilled in the art will understand that the exact nature of the modifications needed to cause a community detection algorithm to use previous TDIO names to increase the temporal consistency of cluster constituents depends on the particular family of community detection algorithms being used. For the broad class of algorithms which optimize some function of cluster quality (often "Fitness Maximization"), one needs only redefine the quality function to penalize temporally inconsistent clusters (clusters whose constituents carry many distinct previous TDIO names are thus "low quality" clusters and vice versa). Given this change, the whole algorithms proceeds as before to optimizing the (newly modified) quality function. Algorithms based on heuristic rules would need their rules modified in order to use the TDIOs to enforce temporal consistency.

Example Successive Runs of First Clustering Process Without TDIO Naming Logic

Figure 17A:
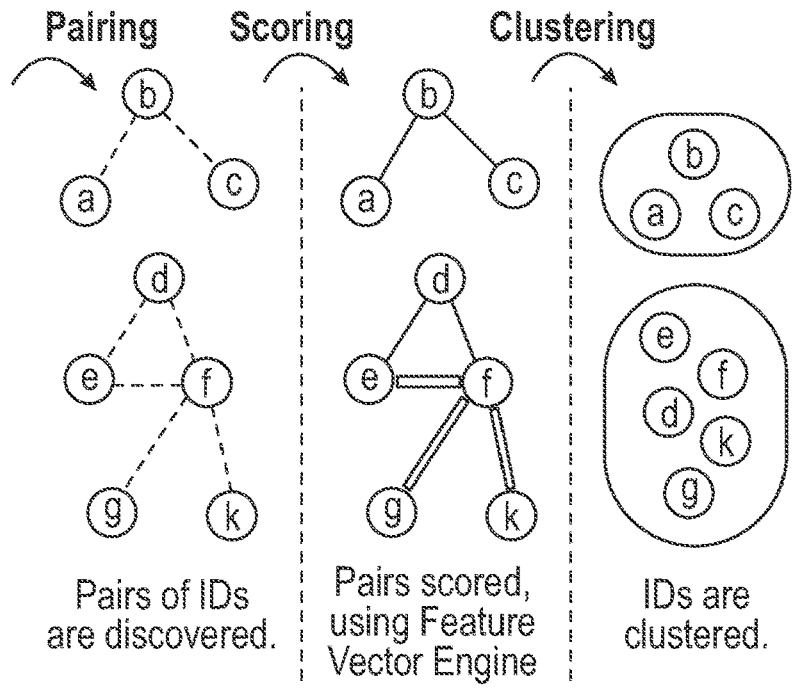
FIGS. 17A-17B are illustrative flow diagrams representing pairing, scoring and clustering operations in the course of two successive runs of the example first clustering process of FIG. 15.
Figure 17B:
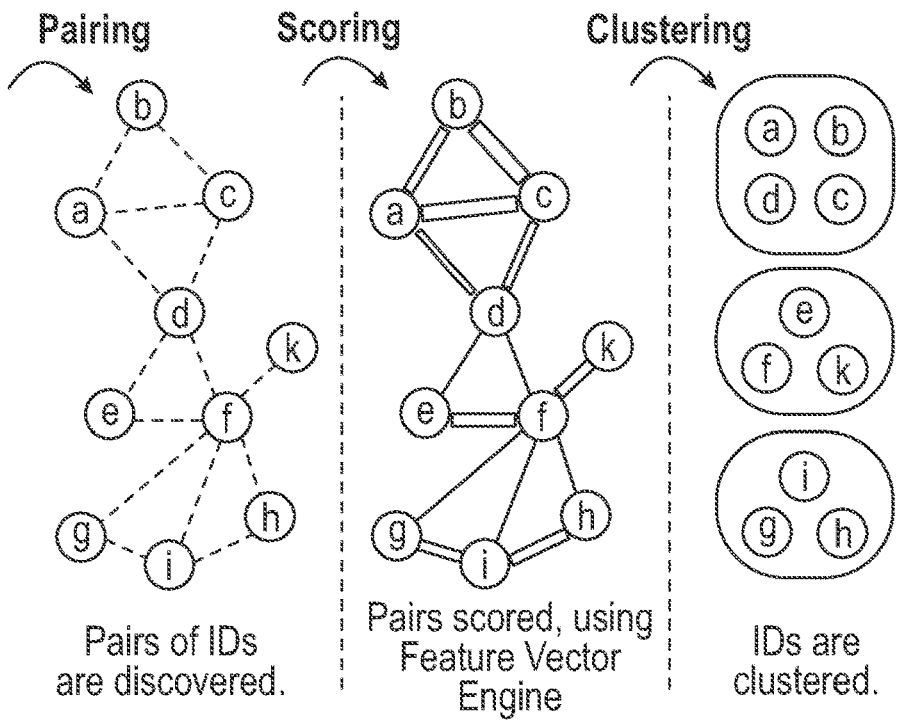

FIGS. 17A-17B are illustrative flow diagrams representing pairing, scoring and clustering operations in the course of two successive runs of the example first clustering process of FIG. 15. An example IDB server 3200 includes one or more processors 3202 that can be configured to run the example first clustering process. In this example, the two successive runs occur at successive time intervals. More particularly, in this example, the two successive runs occur at two successive weeks: Week K and Week K+1, although the time intervals are user-selectable. In accordance with pairing as disclosed in the '248 patent, for example, during a pairing operation, network observation data are used to identify interesting pairs of object identifiers: (a,b), (b,c), (d,e), (d,f), (e,f), (f,g), and (f,k). The pairing operation may produce one or more graph structures as shown. During a scoring operation, as disclosed in the '248 patent, strengths of relationships between identified object identifier pairs associations are scored. In some embodiments, a machine learning (ML) process using feature vectors, as disclosed in the '248 patent, may be used to arrive at pair association scores. During a clustering operation, as disclosed in the '248 patent, clusters of object identifiers are produced based upon the pair association scores of object identifier pairs of the one or more graphs.

In the first run of the example first clustering process at Week K shown in FIG. 17A, pair associations scores are determined for pairs, (a,b), (b,c), (d,e), (d,f), (e,f), (f,g), and (f,k), and used to produce the first and second user clusters (a,b,c) and (d,e,f,g,k). In the second run of the first clustering process at Week K+1 shown in FIG. 17B, the pairing operation observes new object identifier pairs (i,g), (i,f), (i,h), (h,f). In the second run at Week K+1, the scoring operation adjusts the sores of the relationships between object identifier pairs. This score adjustment occurs both for new pairs and for pairs that were known the previous week. In the illustrative drawings of FIGS. 17A-17B, the thickness of lines between object identifiers in the scoring stage is proportional to the strength of pairing relationships; thicker lines signify stronger pairing relationships. During the clustering operation at Week K+1, produces first second and third clusters (a,b,c,d), (e,f,k), and (i,g,h). In the Week K+1, one object identifiers, d, moves from the second cluster to the first cluster. The second cluster splits into two different clusters, representing two different users. One new cluster, the new second cluster, includes object identifiers e, f, k from the previous second cluster. The other new cluster, the new third cluster, includes object identifier, g, from the previous second cluster plus the two new object identifiers, h, and i.

Inventors' Objective to Improve Network-Centric Performance of IDB Server

The inventors recognized that changes in cluster membership based upon changes in pairing and scoring occurring between one run to the next of the first example clustering process of FIG. 15 by an example IDB server including one or more processors configured to run the first clustering process is helpful to represent a best estimate of cluster membership at a time interval of a given run over a given time interval. However, inventors further recognized that in a probabilistic clustering process in which pairing and pair association scoring may be determined based upon probabilistic pairing and probabilistic pair association scoring, clustering results may be probabilistically noisy. The inventors further recognized that cluster membership determined based upon the latest run of the example first clustering process, which does not use the TDIO step, therefore, may not be the best estimate of cluster results where pairing and scoring results may be noisy over multiple runs occurring at different time intervals.

In more informal terms, the first and second clusters output at the end of Week K for the first run of the first example clustering process by an example IDB server 3200 with one or more processors 3202 configured to run the first clustering process represent first and second users, for example. In that case the three clusters resulting from the splitting of the second cluster and the addition of two new MAIDs h and i, can be viewed as the second user being split apart to contribute parts of each of the three clusters, representing three different users, that are output at the end of Week K+1 for the first run of the first example clustering process. Referring to the scoring operations in the first and second runs, it will be appreciated that the pair association scores for pair (d,c) and pair (f,g) have changed in ways that influenced the changes in the clustering. The inventors realized that these pair association scores have an impact upon stability of clustering, which also may be noisy as a result of noise in the scoring.

The inventors, therefore, realized that there is a need to reduce the impact of noise in relationship scores upon stability of the clusters to use clusters, which are TDIOs, as keys in an IDB. The keys in an IDB must refer to stable concepts. C.f. the earlier analogy of SSNs, which make sense as keys in a database (for instance bank records) because SSNs refer to concepts which are very stable (in fact more stable than a person's name, as the usual name change process requires a linking of the SSN to the new name). If SSNs changed every day, for example, they would not be a useful backbone on which to collect data. As explained more fully below, TDIOs are used achieve stability.

Thus, first, the inventors realized that it is desired that the clusters produced are both i) accurate and ii) stable in order that they can be judged as "performing well". The accurate part is evident. The stability part is important because a) the actual truth moves much more slowly than what is naively observed in the noisy data on a network (e.g., therefore inferred users that are constantly changing from one time interval to the next are not likely to be accurate) and b) to support a queryable IDB based on inferred objects as keys, those inferred object keys must refer to relatively stable collections of constituent objects (e.g., a database keyed by SSNs wouldn't be very helpful if we randomly shuffled the assignment of SSNs to people every week). So, the inventors realized that what is needed are accurate and stable cluster names to correspond to accurate and stable relational table keys.

Second, the inventors realized that the accuracy and stability requirements above are not easy to satisfy using previous algorithms or naïve approaches given the scale of the network observation data operated on. For examples, graph structures may include 20 billion vertices and 180 Billion edges, for example. A possible naïve approach would be to keep several successive copies of the data so that we could simply cross-check and require stability, this system would require excessive storage given the massive size of our data. Algorithms previously investigated in the academic context (e.g., https://dl.acm.org/citation.cfm?id=1281212) would typically require excessive amounts of CPU compute resources given the massive size of our data.

Third, the recognition of the accuracy and stability requirements and the recognition of the storage efficiency requirements lead the inventors to configure one or more processors 3202 of an example IDB server 3200 to perform a TDIO name-based pairing/scoring/clustering process in which clustering during a current run of the second clustering process is based in part upon previous TDIO names stored for a previous run of the process. Moreover, the TDIO determination process ensures that TDIO names for a cluster are determined based at least in part upon TDIO names previously associated with names of object identifier members currently within a cluster.

Example Successive Runs of Second Clustering Process With TDIOs

Figure 18A:
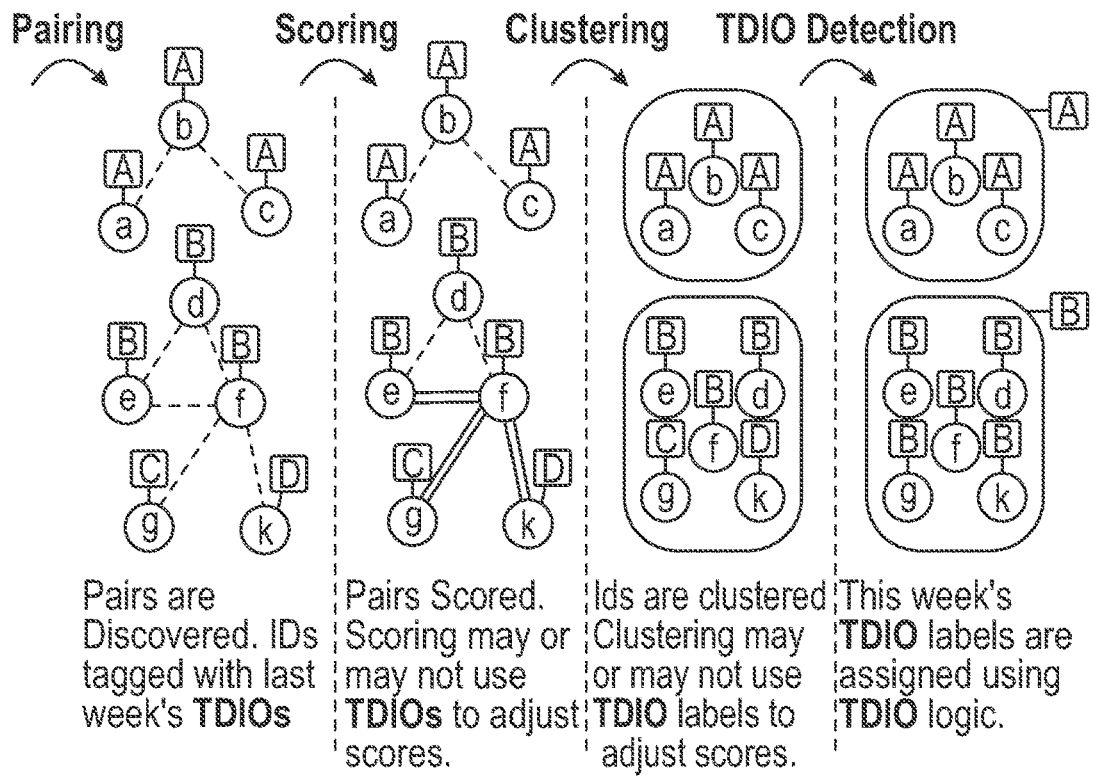
FIGS. 18A-18B are illustrative flow diagrams representing pairing, scoring, clustering, and TDIO detection operations in the course of two successive runs of the example second clustering process of FIG. 17.
Figure 18B:
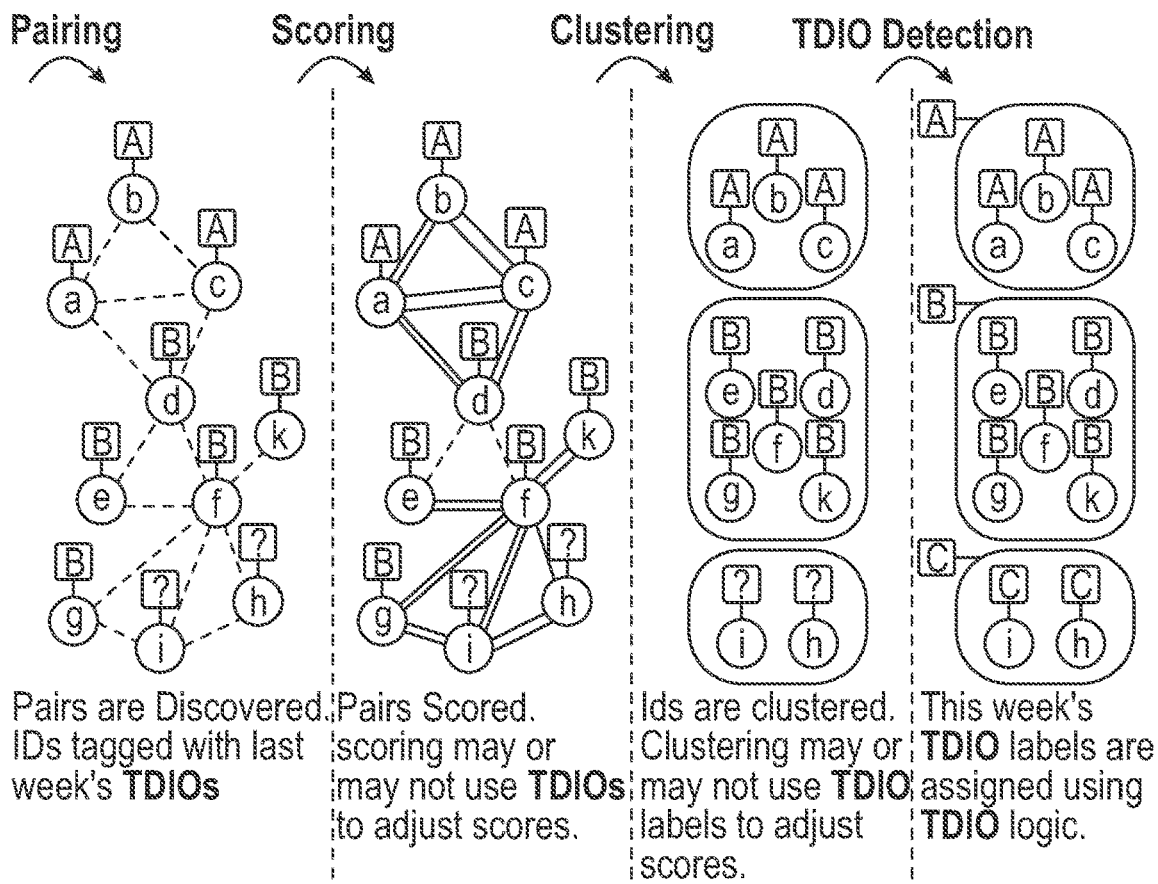

FIGS. 18A-18B are illustrative flow diagrams representing pairing, scoring, clustering, and TDIO detection operations in the course of two successive runs of the example second clustering process of FIG. 16. An example IDB server includes one or more processors 3202 that can be configured by stored program instructions 3224 to run the example second clustering process. In this example, the two successive runs occur at successive time intervals. More particularly, in this example, the two successive runs occur at two successive weeks: Week K and Week K+1, although different time intervals such as daily, bi-weekly, or monthly may be selected, for example. During Week K, a pairing operation uses network observation data to identify interesting pairs of MAIDs.

Referring to FIG. 18A showing the Week K run of the example second clustering process, the pairing operation may proceed similar pairing disclosed in the '248 patent. The pairing operation identifies interesting object identifier pairs (a,b), (b,c), (d,e), (d,f), (e,f), (f,g), and (f,k) to produce one or more graph structures as shown. In this example, it is assumed that during a previous Week (not shown), object identifiers a, b, c, d, e, f, g, and k were named as indicated. Object identifiers a, b, c were named "A". Object identifiers d, e, f were named "B". Object identifier g was named "C". Object identifier k was named "D".

These names signify that in some previous runs (e.g., in one or more previous weeks), object identifiers a, b, c were members of a cluster (a TDIO) named "A"; object identifiers d, e, f were members of a cluster (a TDIO) named "B"; object identifiers g was a member of a cluster (a TDIO) named "C"; and object identifier k was a member of a cluster (a TDIO) named "D". Thus, the object identifier names provide an indication of object identifier's prior cluster (TDIO) memberships. In other words, the object identifier names provide memory of an object identifier's prior cluster (TDIO) memberships.

During a scoring operation, similar to scoring disclosed in the '248 patent, strengths of pair associations between identified object identifier pairs are scored. During a clustering operation, similar to clustering disclosed in the '248 patent, clusters of object identifiers are produced based upon the pair association scores for pairs of object identifiers joined by graph edges of the one or more graphs. However, in some embodiments, one or more TDIO name-based rules may be used in the pair association scoring operation to determine scoring based in part upon the TDIO names associated with object identifiers. Specifically, an example IDB server 3200 includes one or more processors that can be configured with stored program instructions 3224 such that the feature vector generation engine of the machine learning (ML) model of the '248 patent is adjusted so that the feature vector itself includes a feature whose value indicates whether TDIO names associated to the two object identifiers at either end of a pair match each other or not. This adjustment causes edges stretching between objects with matching TDIOs to receive higher pair association In some examples, one or more TDIO name-based rules may be used in the clustering operation, to determine clustering based in part upon the TDIO names associated with object identifiers. Specifically, an example IDB server includes one or more processors 3202 that may be programmed according to program instructions 3224 to perform a modified Louvain algorithm to achieve TDIO name-based clustering.

As yet another alternative example, respective TDIO name-based rules may be used during any of pairing/scoring/clustering operations to respectively determine scoring and clustering based upon the names associated with object identifiers.

Referring to the scoring operation in the first run of the second example process shown in FIG. 18A, the clustering operation creates a first cluster (a TDIO) containing object identifier members a, b, c, each previously named "A" (a TDIO name). The clustering operation also produces a second cluster (a TDIO) containing object identifier members d, e, f, each previously named "B" (a TDIO name); an object identifier g, previously named "C" (a TDIO name); and an object identifier k, previously named "D" (a TDIO name).

Referring to the TDIO determination operation in the first run of the second example process shown in FIG. 18A, the TDIO determination operation receives the first and second clusters and produces first and second TDIO output clusters with the same object identifier membership as the clusters produced at the clustering operation. More specifically, the TDIO determination operation produces a first TDIO output cluster currently named "A" (a TDIO name) having as members object identifiers a, b, c, all named "A" (a TDIO name). The TDIO determination operation also produces a second TDIO output cluster currently named "B" (a TDIO name) having as members d, e, f, g, and k, all named "B". Thus, in Week K of the example second clustering process, the TDIO determination operation renamed object identifiers g and k to newly name both as, "B" (a TDIO name). Thus, the TDIO determination operation provides each inferred cluster and the members of the inferred cluster with a shared unique TDIO name. Moreover, as explained more fully below, associations of unique TDIO names with object identifiers are stored and used as a basis for one or more of pairing/scoring/clustering the next time around.

Referring to FIG. 18B showing the Week K+1 run of the example second clustering process, the pairing operation may proceed similar pairing disclosed in the '248 patent. The pairing operation identifies interesting pairs (a,b), (b,c), (a,c), (a,d), (c,d), (d,e), (d,f), (f,k), (f,g), (f,i), and (f,h), to produce one or more graph structures, as shown. In this example, it is assumed that during a previous (not shown), object identifiers a, b, c were assigned the name "A" (a TDIO name); object identifiers d, e, f, g, and k were assigned the name "B" (a TDIO name); and that object identifiers i and j were previously unknown (e.g., newly discovered during Week K+1), and therefore are not named, indicated by question marks ("?") in the drawing.

During the scoring operation, similar to scoring disclosed in the '248 patent, strengths of relationships between identified object identifier pairs are scored. During the scoring operation in some examples, the one or more TDIO name-based rules described above may be used in pair association scoring step to determine pair association scoring based in part upon the TDIO names associated with object identifier pairs.

During the clustering operation, similar to clustering disclosed in the '248 patent, clusters of object identifiers are produced based upon the pair association scores of object identifier pairs of the one or more graphs. In some examples, during the clustering operation, one or more TDIO name-based rules described above are used to determine clustering based in part upon the TDIO names associated with object identifiers. In particular, in the Week+1 run example of the second clustering process, the clustering operation produces first, second and third clusters, which are created at least in part based upon TDIO-based rules. The first cluster has as members object identifiers a, b, c previously named "A" (a previously assigned TDIO name). The second cluster has as members device IDs MAIDs d, e, f, g, and k previously named "B". The third cluster has as members MAIDs i and j that are unlabeled (unnamed), as indicated by question marks ("?") in the drawing.

During the TDIO determination operation, the first cluster (a TDIO) is assigned the name "A", a TDIO name that matches the previously assigned TDIO names of its members, a, b, c. The second cluster (a TDIO) is assigned the name "B", a TDIO name that matches the previously assigned TDIO names of its members, d, e, f, g, and k. The third cluster (a TDIO) is assigned the name "C", and the object identifier members of the third cluster are assigned the TDIO name "C" to match the TDIO name assigned to the TDIO cluster "C" in which they are members. Thus, in this Week K+1 example, the newly added object identifiers i an h are added to a newly named cluster "C" and are named to share the TDIO name "C".

Thus, it will be appreciated that in the examples in FIGS. 18A-18B of the Week K and Week K+1 runs of the second clustering process, multiple object identifiers are received at the pairing step that are associated with TDIO names assigned during one or more previous runs. The TDIO names associated with the object identifiers match the TDIO names of clusters created during one or more previous runs of the second clustering process that contained the object identifiers associated with matching TDIO names as members. Moreover, it will be appreciated that during a current run of the second clustering process, one or more of the pairing/scoring/clustering operations uses one or more TDIO name-based rules to determine a respective pair association score and/or a respective cluster membership using one or more TDIO name-based rules to encourage clustering of MAIDs having matching names.

Figure 19:
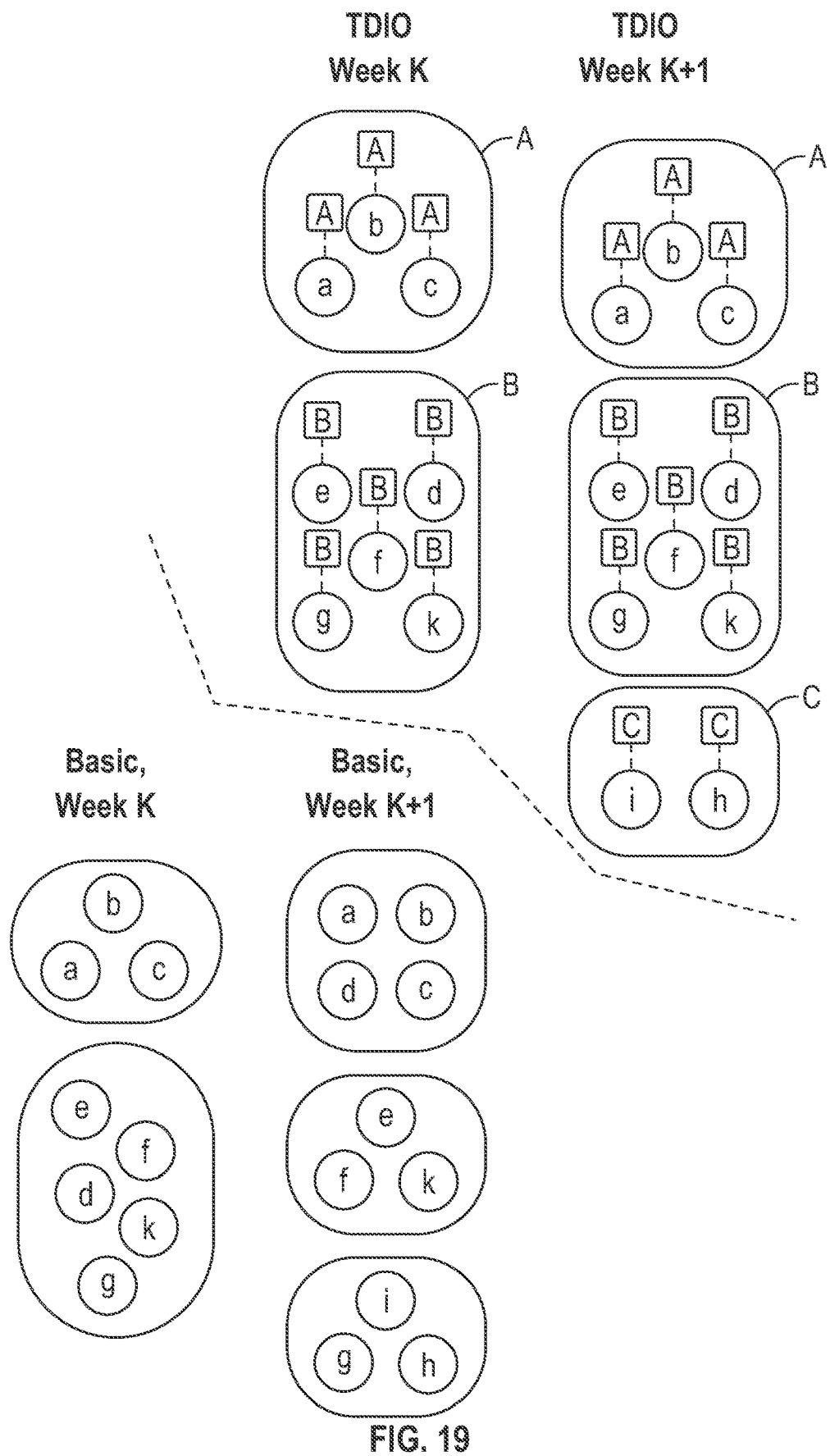
FIG. 19 is an illustrative drawing contrasting clustering at two consecutive time intervals according to the example first and second clustering processes shown in FIGS. 17A-17B and FIGS. 18A-18B, to show improved stability using the example second clustering process.

Contrasting the Clustering Results of the Example First and Second Clustering Processes to Illustrate Improved Cluster Stability FIG. 19 is an illustrative drawing contrasting clustering at Week K and Week K+1 according to the example first and second clustering processes shown in FIGS. 17A-17B and FIGS. 18A-18B, to show improved stability using the example second clustering process. In this comparison both the example first clustering process and the example second clustering process produce two clusters at Week K. Each cluster may identify a different inferred user based upon the object identifiers associated with the cluster. In Week K for both the example first and second cluster processes, a first cluster has member object identifiers a, b, c, and a second cluster has member object identifiers d, e, f, g, k. However, in Week K+1, the example first clustering process, which lacks the TDIO determination operation, splits apart the members of the second cluster of Week K which had member object identifiers d, e, f, g, k, among three different clusters. In contrast, however, in Week K+1, the example second clustering process, with the TDIO determination operation, TDIO name-based rules are applied, which in this example, keep the first cluster assigned TDIO name "A" and second cluster assigned TDIO name "B" of Week K intact, and creates a new cluster assigned TDIO name "C" to contain new object identifiers i and h.

Encouraging clustering based upon TDIO names previously assigned to object identifiers encourages stability of clusters from one run to the next. As explained above, cluster names may be used as keys in Relational Tables. Encouraging cluster stability, encourages stability of the relational tables. Stability of the relational tables in turn encourages stability of a computer system by encouraging object identifier members of a cluster with a given TDIO name during one run to be members of a cluster having that same TDIO name during a subsequent run. Thus, the TDIO determination logic imbues the system with some memory of how object identifier names and cluster names have been changed over time, which allows reduced noise while maintaining quality of the found clusters in relational tables. Therefore, TDIO determination process involves a naming system, which naturally produces keys that can be used to enumerate records in a probabilistically generated identity database.

Example TDIO Naming Logic

TDIO naming logic includes name proposal generation operation and a name de-duplication operation.

Table 1 sets forth a TDIO name proposal generation logic, in accordance with some embodiments.

TABLE 1

For each cluster do:
1. CALCULATE NAÏVE TDIO NAME as:
   i) Obtain a sorted list of cluster constituent names.
   ii) Concatenate these names into one string.
   iii) Append a random float onto this string.
   iv) SHA256 hash this string
2. DECIDE PROPOSED TDIO NAME as:
   i) Count all IDs with non-missing/null previous TDIO names, call this count L.
   ii) Case When L = 0: Proposed TDIO is the Naive TDIO name.
      Case When L > 0: Calculate the frequency of occurrence for non-missing/null previous TDIO names. Proposed TDIO is the previous TDIO name with the highest constituent count.

Table 2 sets forth a TDIO name de-duplication logic, in accordance with some embodiments.

TABLE 2

Group clusters by proposed TDIO name, count how many clusters are proposing to adopt each TDIO, call this count P.
Case When P = 1: Adopt the proposed TDIO as the new TDIO for this cluster.

TABLE 2-continued

Case When P > 1: The cluster with the most constituents having the proposed TDIO name as their previous TDIO name is allowed to adopt this TDIO name as their new TDIO name. Other clusters adopt their naive TDIO name as their new TDIO name.

Figure 20A:
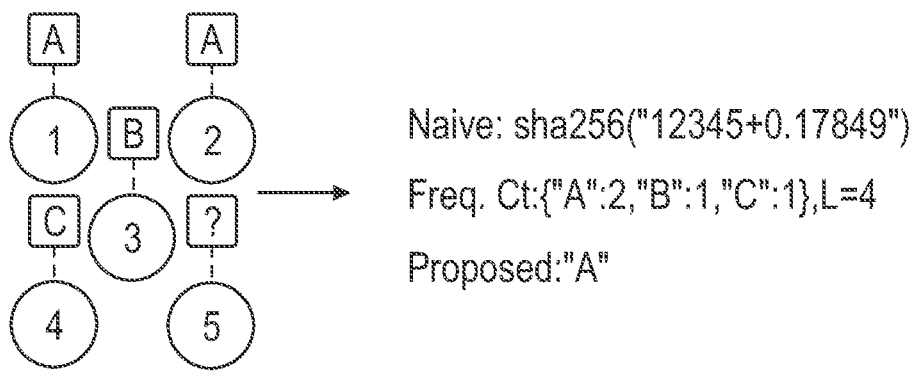
FIGS. 20A-20C are three illustrative diagrams of three examples of use of TDIO naming logic.
Figure 20B:
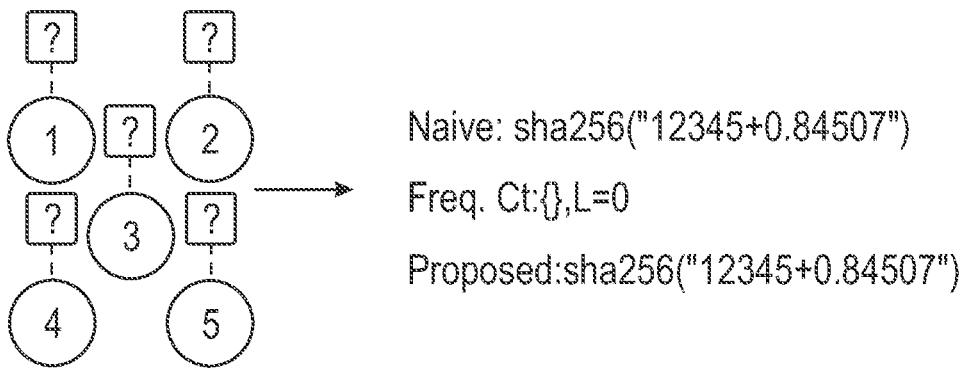
Figure 20C:
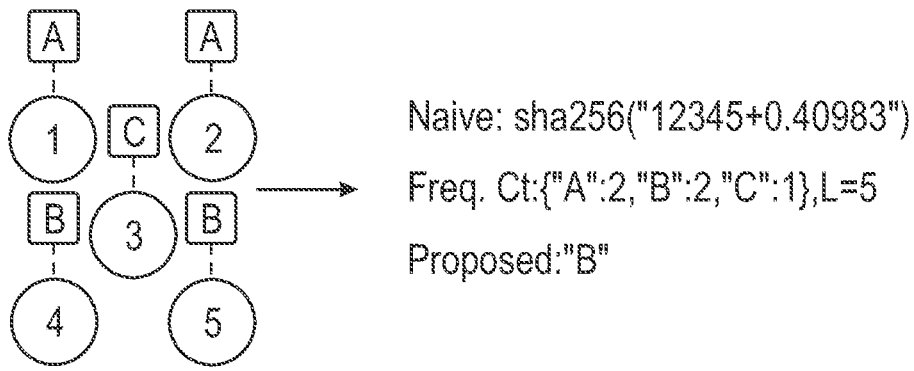

FIGS. 20A-20C are illustrative diagrams of examples of use TDIO logic in with the above TDIO naming logic. TDIO name ties are broken randomly; a proposed TDIO names will be adopted by a TDIO provided that there are not multiple clusters vying for that same proposed name; and all TDIO names are initially generated as naive names.

Figure 21:
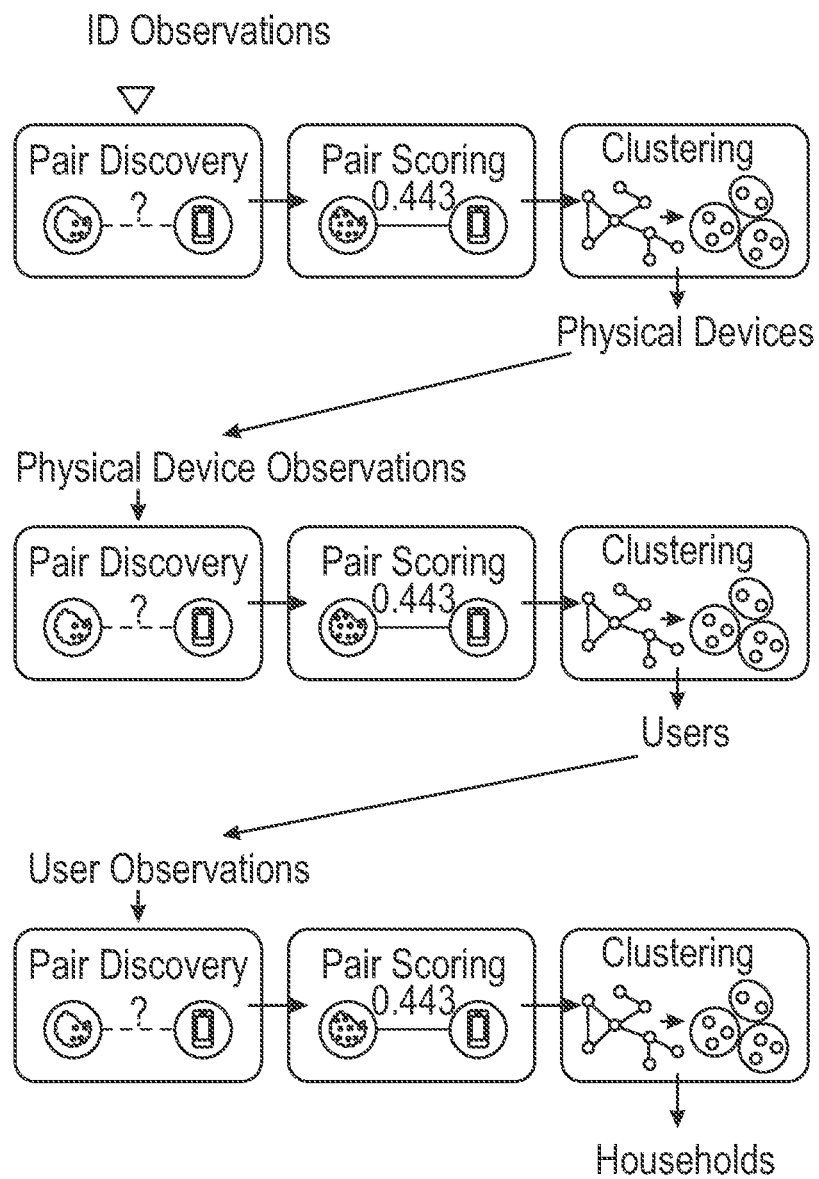
FIG. 21 is an illustrative diagram representing an example hierarchy of probabilistic identities produced based upon the example first clustering process of FIG. 15, which lacks TDIO logic.

Example of Hierarchy of Probabilistic Identities Based Upon the First Example Clustering Method, Without TDIO Naming Logic FIG. 21 is an illustrative diagram representing an example hierarchy of probabilistic identities produced based upon the example first clustering process of FIG. 15, which lacks TDIO logic. In the hierarchy of FIG. 21, observed network data for physical devices are clustered to infer probabilistic physical device identity objects corresponding to actual physical devices. Device identity object identifiers produced based upon the observed network data, in turn, are clustered to infer probabilistic user identity objects corresponding to actual users. User identity object identifiers, in turn, are clustered to infer probabilistic household identity objects corresponding to actual physical households. The term 'household' as used herein refers to a group of people living together.

Figure 22:
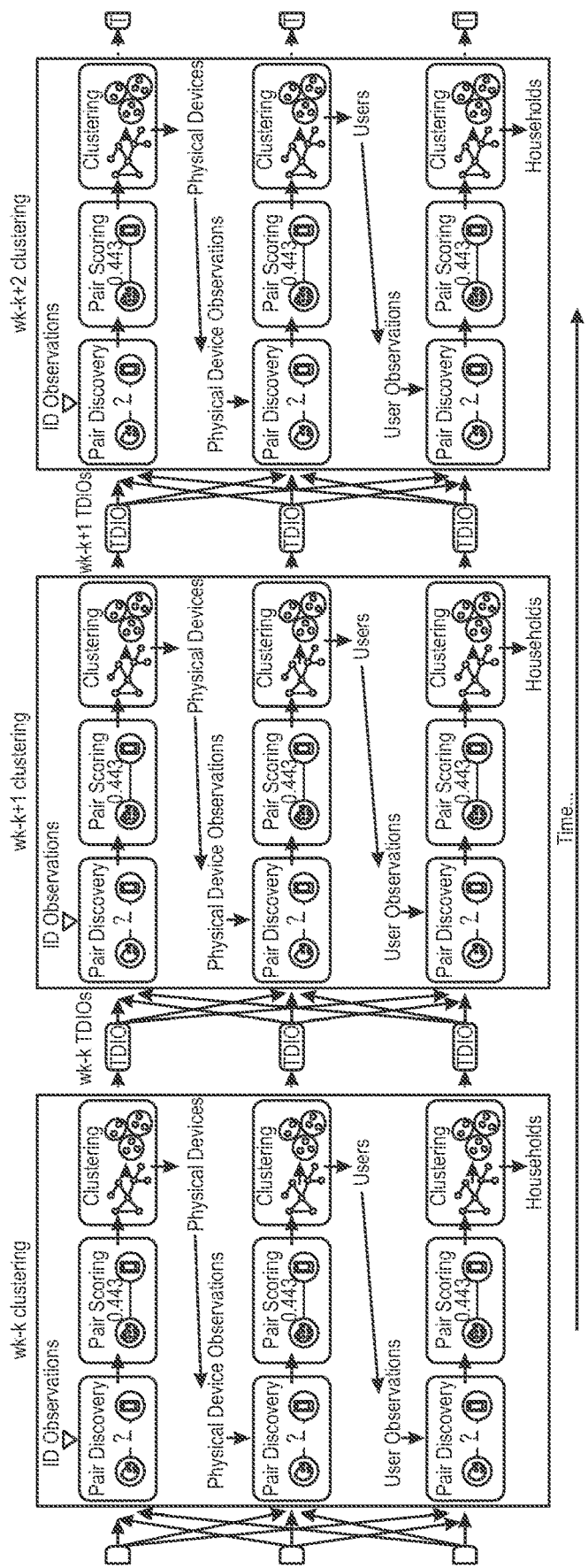
FIG. 22 is an illustrative diagram representing an example time sequence of hierarchies of probabilistic identities produced in accordance with some embodiments.

The inventors have recognized that an inferred hierarchy of probabilistic identity objects can be created to act as a basis to produce a hierarchy of keys within relationship tables of a database used to access attributes associated with the probabilistic identity objects at different levels of the hierarchy Example of Hierarchy of Probabilistic Identities Based Upon the Second Example Clustering Method, With TDIOs FIG. 22 is an illustrative diagram representing an example time sequence of hierarchies of probabilistic identities produced in accordance with some embodiments. The IDB server 3200 includes one or more processors 3202 that may be programmed according to program instructions 3224 to use the second clustering process to produce the example time sequence of hierarchies of probabilistic identities. An instance of the example first process of FIG. 16, which includes TDIO logic runs at each of sequence of time windows, Week-K, Week K+1, Week K+2, etc. At each time window, TDIOs from a previous time window are received as input and TDIOs from the current time window are output for provision to a next time window. For example, at Week K+1, TDIOs from an instance of the second clustering process run at Week K are received as input and TDIOs output by the instance of the second clustering process run at Week K+1 are provided for input to an instance of the second clustering process run at Week K+2. Moreover, at each time interval, multiple levels of an instance of the first clustering process may utilize more than one level of TDIOs. For example, a first TDIO-based clustering rule may be weight against changing the user cluster in which a physical device is member, and a second TDIO-based clustering rule may more heavily weight against changing the user cluster in which a physical device is member if the change is to be a cluster of a user that is a member of a different household. More particularly, for example, TDIO-based clustering rule can be implemented to generally choose to penalize more heavily the movement of one device from a user in one HH to that in different HH than it does for moving the device between two users in the same HH. Makes sense. Thus, a hierarchy of TDIOs may be used with TDIO-based rules to stabilize a hierarchy of probabilistic identities.

System Flow Diagram

Figure 23:
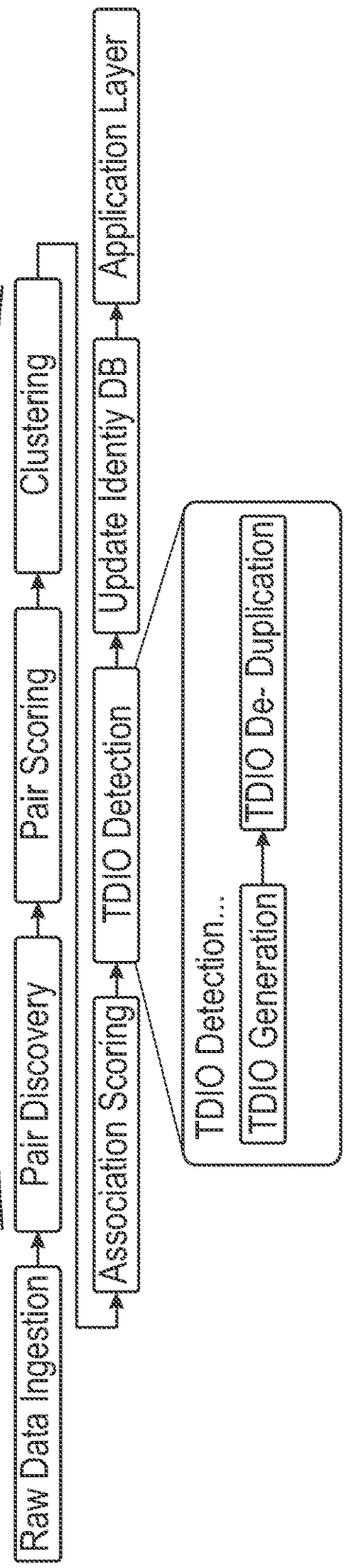
FIG. 23 is an illustrative system level diagram representing configuration of the IDB server to run the second clustering process of FIG. 16.

FIG. 23 is an illustrative system level diagram representing configuration of the IDB server to run the second clustering process of FIG. 16. The IDB server 3200 includes one or more processors 3202 that may be programmed according to program instructions 3224 to perform the functions of the modules of the system level diagram of FIG. 23.

An example pairing module performs a TF-IDF-like (TF-IDF is a well-known algorithm in the information retrieval field: https://en.wikipedia.org/wiki/Tf%E2%80%93idf) scoring of identifier co-occurrences on bipartite identifier and 'proxy' networks, where the 'proxy' object is typically a spatio-temporal localization, for example and (IP-address, date) tuple.

An example pair association scoring module determines pair association scores based in part upon one or more of pair scoring as described in the '248 patent at column 17, line 24 to column 19, line 23, with reference to FIG. 8-9 of the '248 patent, which is expressly incorporated herein by this reference, and/or upon factors explained above with reference to FIG. 11A and based in part upon TDIO name-based rules that involve adding TDIO names to feature vectors disclosed in the '248 patent.

An example clustering module determines clustering based in part upon factors explained in the '248 patent at column 20, line 52 to column 22, line 14 with reference to FIGS. 12-14 of the '248 patent, which is expressly incorporated herein by this reference, and based in part upon TDIO name-based rules that involve a community detection algorithm.

An example cluster-level relationship scoring module determines levels of membership strength of object identifier members of each TDIO cluster. FIGS. 11B-11C and corresponding explanation above set forth alternate example algorithms to implement the cluster-level association module.

A TDIO determination module determines unique TDIO names to associate with TDIOs (clusters) created by the clustering module. The TDIO determination block, assigns to each object identifier member of a TDIO the unique name assigned to the TDIO in which it is a member. In accordance with some embodiments, the TDIO module includes a TDIO name generation module and a TDIO name de-duplication module. The de-duplication module ensures that all TDIOs have unique names. More particularly, the de-duplication block ensures that TDIOs within a cluster have a matching labels (names) that match the name of the cluster.

An update identity database module updates the IDB based upon the TDIO names and TDIO object identifier membership and attribute information associated with TDIO object identifier members. Updating includes one or more of adding a new object class/type or modifying tables for a previously created class/type. The updating involve modifying one or more of relationship tables, graph context tables and relationship tables of an IDB. Updating the IDB involves one or more of creating tables to add a new object type such as an object type representing emails received, for example.

An example application layer module prepares and distributes datasets obtained from an IDB to third parties, such as customers, for example. This process typically involves configuration (e.g., via the GUI or query interface) of the delivery logic so that each customer receives the data that suits their needs. There are various modalities for how the data is returned. For example, some customers receive batch uploads of their query results while some receive real-time responses to their queries via our real-time query API. All of this preparation and delivery is the responsibility of the application layer.

TDIO Determination Block Operation

Figure 24:
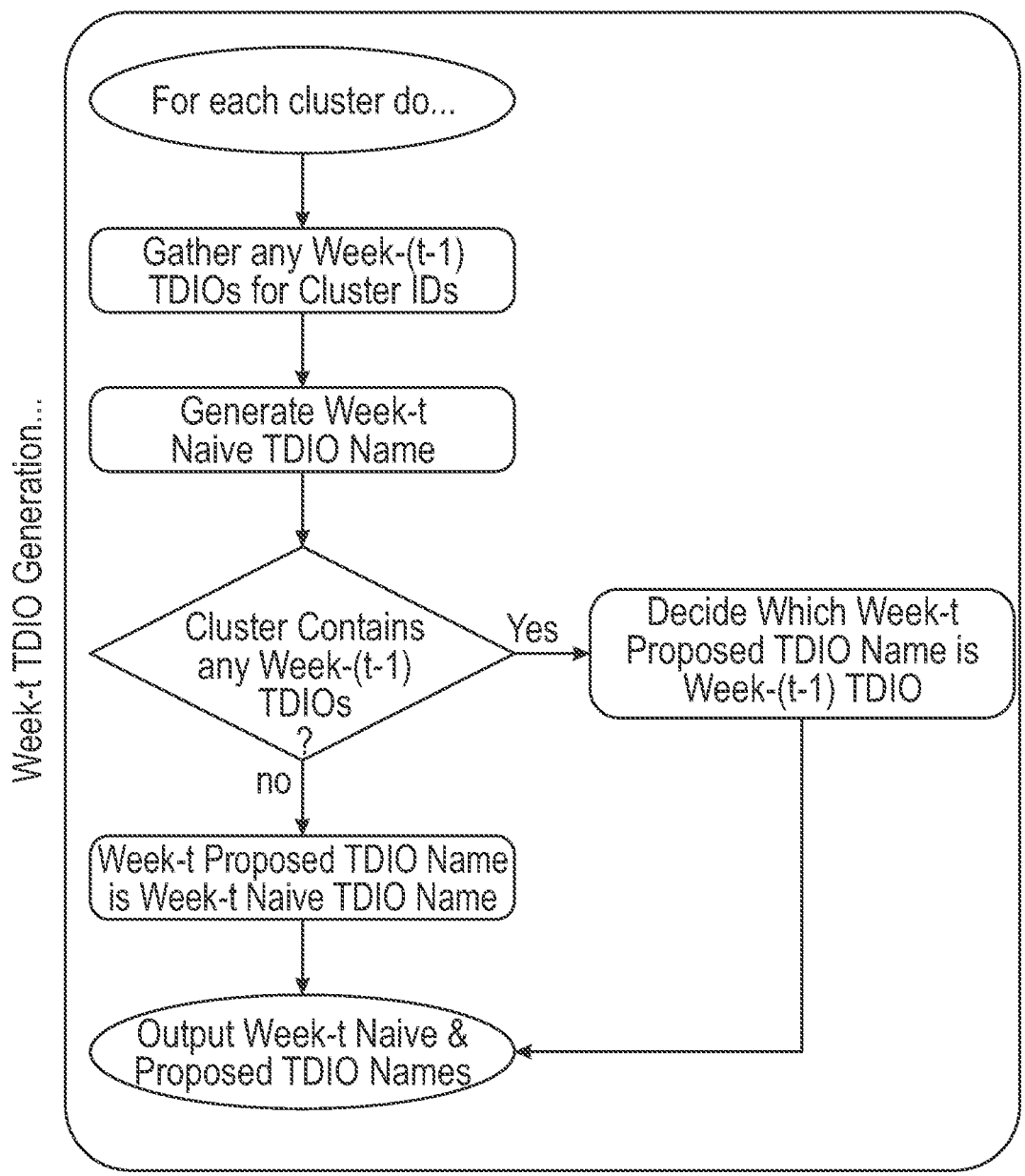
FIG. 24 is an illustrative flow diagram representing an example TDIO name generation process.

FIG. 24 is an illustrative flow diagram representing an example TDIO name generation process. The TDIO name generation module of FIG. 23 is configured to implement the TDIO name generation process. The TDIO name generation process runs for each cluster at each time interval at which the system of FIG. 23 runs the second clustering process, e.g. each Week. The TDIO name generation operation produces as output for each cluster for which it runs, a naïve name and a proposed TDIO name for the cluster. A first operation collects TDIO names previously associated with the member TDIOs of a current cluster. Previous associations of TDIO names with object identifiers are stored in a non-transitory storage medium. A second operation generates a naïve name for the current cluster. As used herein, the term 'naïve name' refers to a newly created TDIO name. In some embodiments a naïve name may be generated based upon a hash of time or hash of a random number, for example. A third decision operation refers to the previously stored associations between TDIO names and object identifiers to determine whether one or more object identifier members of the current cluster were previously associated with a TDIO. In response to the third decision operation determining that the current cluster does contain an object identifier having a previously assigned TDIO name, a fourth operation determines which previous TDIO name of an object identifier member to nominate as a proposed TDIO name for the current cluster and its members. As used herein a 'proposed name' refers to a name that is based upon a previously existing TDIO name. In some examples of the fourth operation, if there is different TDIO names were previously associated different object identifier members of the current cluster, then the fourth operation selects among those different names to determine which of the previous TDIO names should become the proposed name for the cluster. In response to the third decision operation determining that the current cluster does not contain an object identifier member previously associated with a TDIO name, a fifth operation determines that the current cluster name should become the naïve name.

Figure 25:
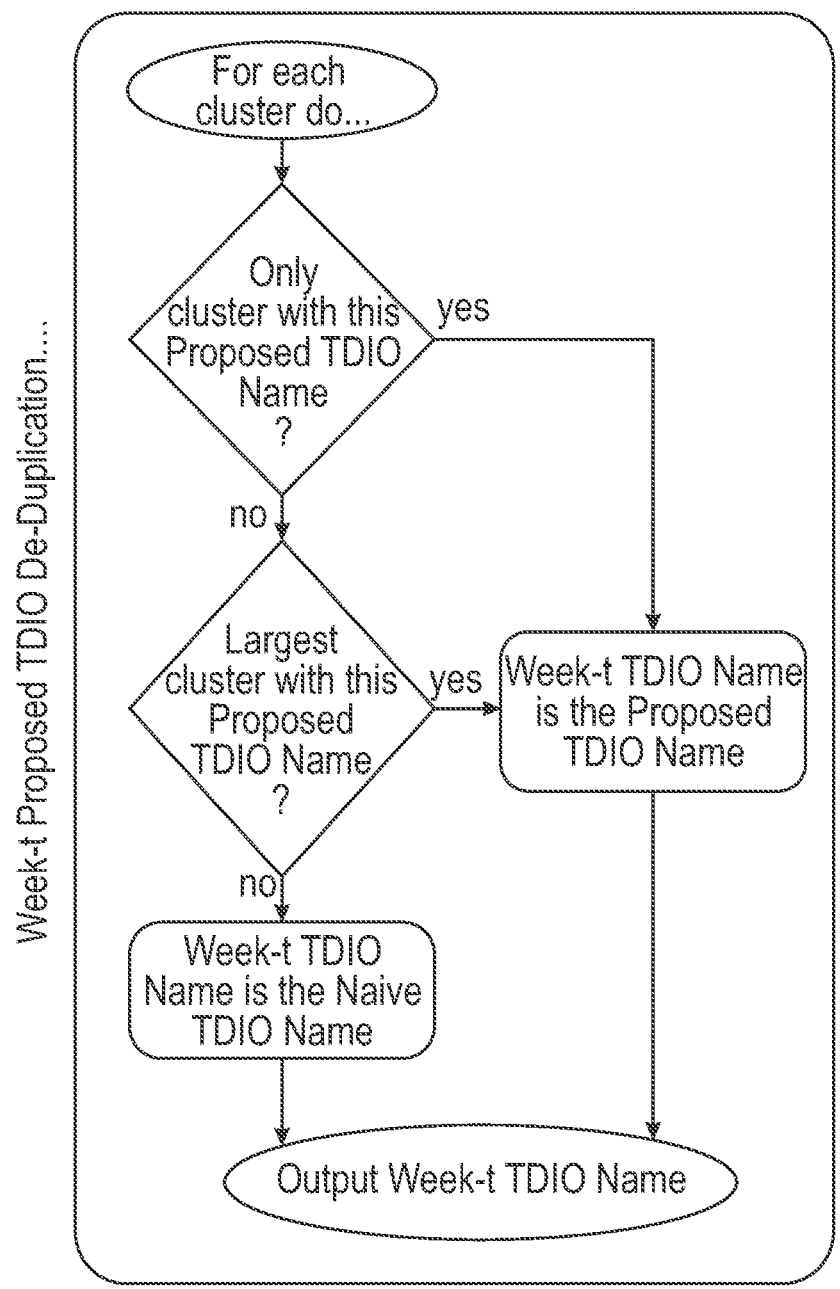
FIG. 25 is an illustrative flow diagram representing an example TDIO name de-duplication process.

FIG. 25 is an illustrative flow diagram representing an example TDIO name de-duplication process. The TDIO name de-duplication module of FIG. 23 is configured to implement the TDIO name de-duplication process. The TDIO name de-duplication process runs for each cluster for which the TDIO name generation process of FIG. 24 outputs a proposed name. The TDIO de-duplication process runs at each time interval at which the system of FIG. 23 runs the second clustering process, e.g. each Week. The TDIO name de-duplication process produces as output for each cluster for which it runs, a TDIO name for the cluster and for the object identifier members of the cluster. A first decision operation determines for a current cluster (a TDIO) whether the current cluster is the only cluster with the TDIO name proposed for the cluster by the TDIO name generation process of FIG. 23. If no, then a second decision operation determines whether the current cluster is the cluster with the largest number of member object identifiers previously associated with the current cluster's proposed TDIO name. Alternatively, in some examples of the TDIO name de-duplication module, the second decision operation determines whether the current cluster is the cluster containing the largest number of TDIO object identifier members.

An objective in associating TDIO names with a cluster and with a cluster's object identifier members is to slow down the rate of change to keys in relationship tables that correspond to TDIO names of clusters. Each TDIO name corresponds to and is identical to a key in a relationship table. By storing previous associations between TDIO names and object identifiers and biasing TDIO naming in favor of naming a TDIO based upon a previous TDIO name associated with the largest number of object identifier names within a cluster, TDIO naming will be more consistent from one time interval to the next. Since relationship table keys are created and updated to match TDIO names, consistency in TDIO naming of clusters results in stability of keys within relationship tables.

Still referring to FIG. 25, in response to the first decision operation determining that the current cluster is the only cluster with the proposed TDIO name, control flows to a third operation that selects the current cluster's proposed name as the TDIO name for the current cluster and for the object identifier members of the current cluster. In response to the second decision operation determining that the current cluster is the cluster with the largest number of member TDIOs associated with the proposed name, for example, control flows to a third operation that selects the current cluster's proposed name as the TDIO name for the current cluster and for the object identifier members of the current cluster. In response to the second decision operation determining that the current cluster is not the cluster with the largest number of member TDIOs associated with its proposed TDIO name, for example, control flows to a fourth operation that selects the current cluster's naïve TDIO name for the current cluster and for the object identifier members of the current cluster.

Fuzzy Clustering

A fuzzy cluster represents a probabilistically inferred object (a TDIO) (e.g., representing a device, a user or a household) that includes one or more object identifier members and includes score information (e.g., relationship scores) indicative of strengths of the membership of the object identifier members to the fuzzy cluster. The term 'clustering' refers to a partition of a set of constituent object identifiers. The term 'standard clustering' as used herein refers to a clustering in which each ID belongs to one and only one cluster in the partition. Standard clustering is sometimes termed as 'hard' or 'crisp' clustering. The term 'fuzzy clustering' as used herein refers to clustering in which object identifier members can be members of multiple fuzzy clusters; typically, an object identifier that is a member of one or more fuzzy clusters is associated with one or more score values indicative of its strength of membership in each fuzzy cluster. An object identifier that is a member of a fuzzy cluster often is associated within a non-transitory storage device, with a cluster membership vector whose length represents the number of clusters available and whose elements describe the level of membership of the object identifier in particular clusters.

Figure 26:
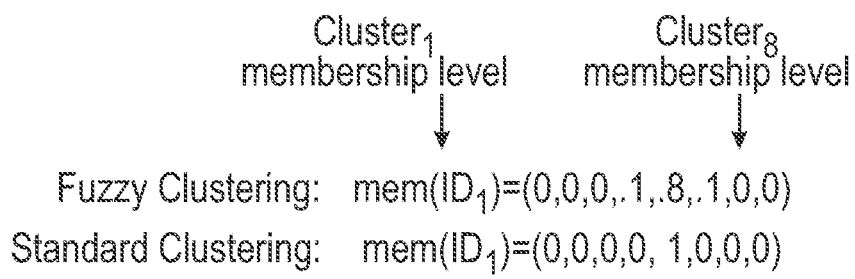
FIG. 26 is an illustrative drawing representing two example object identifier cluster membership vectors.

FIG. 26 is an illustrative drawing representing two example object identifier cluster membership vectors. A first membership vector indicates example fuzzy cluster memberships of an object identifier $ID_1$. A second membership vector indicates example standard cluster memberships of the object identifier $ID_1$. The example fuzzy clustering vector indicates that the example $ID_1$ is a member of at least three fuzzy clusters that its strength of membership is 0 for those clusters in which it is not a member, 0.1 for two fuzzy clusters, and 0.8 one of the fuzzy cluster. The example standard clustering vector for $ID_1$ indicates membership in only one standard cluster for which its strength of membership is 1. The standard clustering vector indicates a strength of membership of 0 in clusters in which $ID_1$ is not a member.

Figure 27:
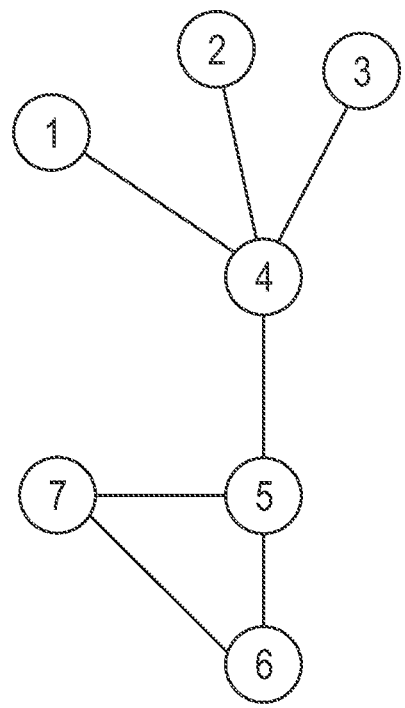
FIG. 27 is an illustrative drawing representing a graph connecting a collection of object identifiers and a corresponding collection of fuzzy membership vectors indicating fuzzy membership of each object identifier.

FIG. 27 is an illustrative drawing representing a graph connecting a collection of object identifiers ($ID_1$ to $ID_6$) and a corresponding collection of fuzzy membership vectors indicating fuzzy membership of each object identifier. In this example, each object identifier is recognized as a member of a fuzzy clustering reachable within two steps originating from the object identifier whose membership is being calculated. Vector, mem(1) indicates, for example, that $ID_1$ is a member of the fuzzy clusters defined by $D_1$-$ID_5$, since $ID_1$ is reachable from these IDs in two steps. Vector, mem(4) indicates, for example, that $ID_4$ is a member of the fuzzy clusters defined by $ID_1$-$ID_7$. Vector mem(7) indicates, for example that ID7 is a member of the fuzzy clusters defined by $ID_4$-$ID_7$.

Figure 28:
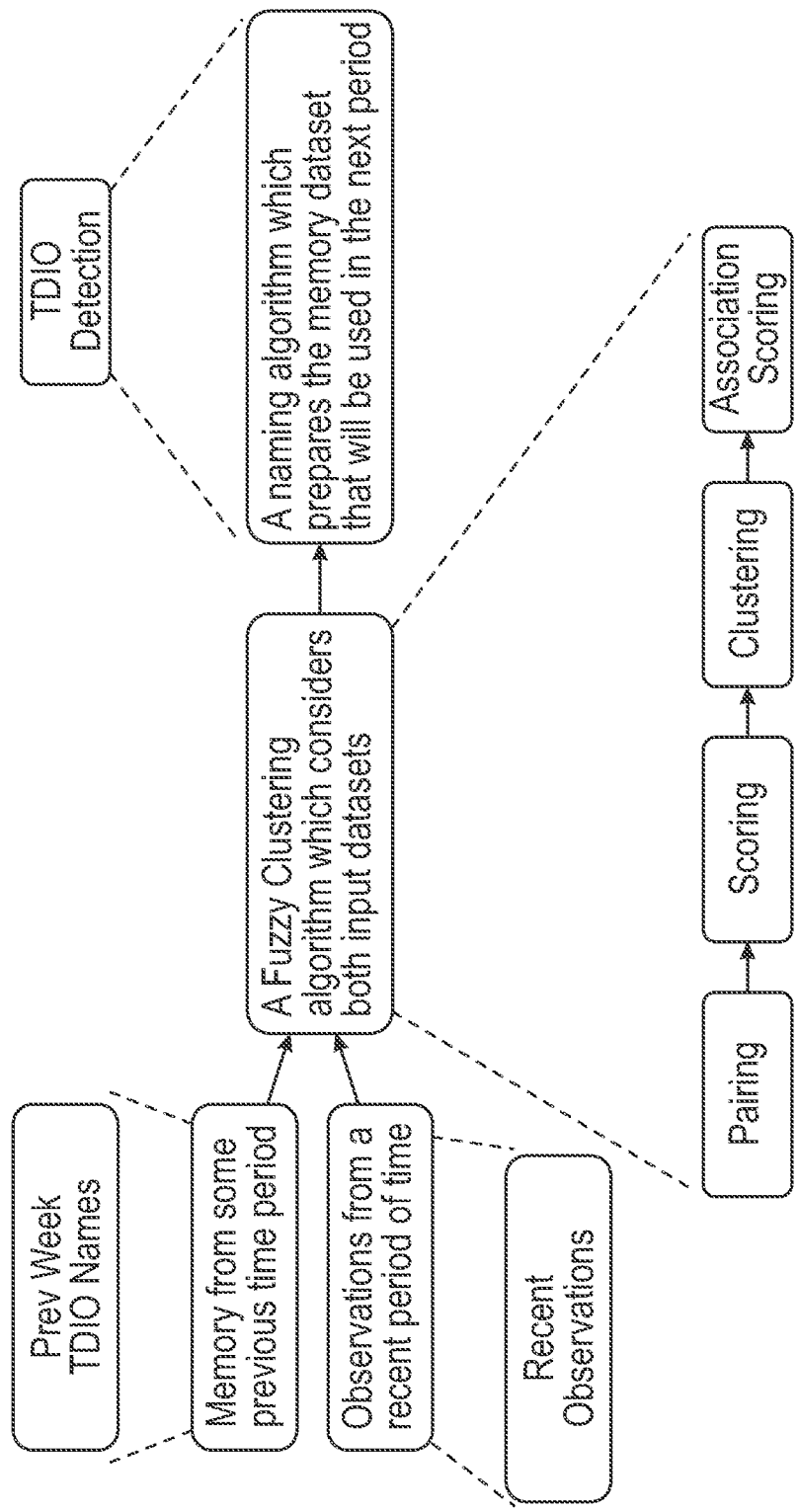
FIG. 28 is an illustrative example system level diagram representing configuration of the IDB server to create fuzzy clusters of object identifiers and to score relationship strengths of object identifiers to fuzzy clusters.

FIG. 28 is an illustrative example system level diagram representing configuration of one or more processors 3202 of the IDB server 3200 according to program instructions 3224, to create fuzzy clusters of object identifiers and to score relationship strengths of object identifiers to fuzzy clusters. The program instructions includes instructions to configure the one or more processors to recurrently perform the functions of the modules of the system at selectable time intervals (e.g., Weekly), to create fuzzy clusters of object identifiers and to score relationship strengths of object identifiers to the fuzzy cluster.

A first input module provides as input to a main fuzzy clustering module, TDIO names determined for a previous time interval, e.g., a previous week. Previous associations between TDIO names and object identifiers are stored in a computer readable non-transitory storage device. A second input module provides as input to the main fuzzy clustering block, network data observations for a current time interval, e.g., observations from the current week. The main fuzzy clustering block receives the previous associations between TDIO names and object identifiers and the network data observations and produces fuzzy clusters and object identifier relationship scores as output. In some embodiments, the fuzzy clustering block includes a pairing module, a pair scoring module, a clustering module and an object relationship scoring module.

An example pairing module determines object identifier pairings as described with reference to FIG. 23. However, the TDIO name-based portion of pair association scoring is vectorized.

An example scoring pair association module determines pair association scores as described with reference to FIG. 23. However, the TDIO name-based portion of pair clustering is vectorized.

In some example systems to create fuzzy clusters, at least one of the three, pairing/scoring/clustering, modules have been modified to account for what are now previous weeks' TDIO vectors that are being carried by each identifier. The ways in which these TDIO vectors would be incorporated are vectorized analogues of the ways that they would have been incorporated in the crisp clustering variant. For example, if one wants to incorporate TDIOs in the scoring block in a) the crisp cluster version one might include a feature which says whether the TDIOs of the objects at either end of the pair match, whereas b) in the fuzzy cluster version one replaces the binary match/no-match feature with a vector dot product between the two vectors. It is also apparent that, when only a single entry is non-zero (i.e. a crisp example within fuzzy clustering), the vector dot product feature would reduce exactly to the match/non-match feature. That is an example for the scoring case.

An example fuzzy clustering module determines fuzzy clustering based in part upon factors explained in the '248 patent at column 20, line 52 to column 22, line 14 with reference to FIGS. 12-14 of the '248 patent, which is expressly incorporated herein by this reference, and based in part upon TDIO name-based rules that involve the community detection algorithm. With fuzzy clustering, object identifiers may belong to many clusters with varying levels of membership. So, we can consider that the output of the pairing/scoring/clustering chain is a set of clusters, each of which is defined by a vector of membership levels. Typically, the vector is of length N, where N is the total number of object identifiers, though many of the entries may be zero.

An example relationship scoring module scores relationships between clusters and their constituents, such as the 'leveling' process described earlier (Randy-4, Randy-7, etc.). These scores would populate relationship tables in the IDB that pair clusters with their constituents, i.e., between objects identifiers in adjacent hierarchical levels of organization (for example the HH-User relationship table would include scores according to each User's membership in their associated HH). A TDIO determination module produces a unique TDIO name for each cluster and associates the unique with each member object identifier of the cluster. The function and structure of the TDIO determination module of FIG. 29 corresponds to that of the TDIO determination module of FIG. 24 described above. However, since object identifier members of a fuzzy cluster may be members of multiple clusters, they may have composite names based upon their strength of membership within different clusters indicated by their membership vectors. For example, three clusters may be assigned TDIO names 'Fred'. 'George' and 'Linda'. For example, an object identifier ID1 may have a fuzzy cluster membership vector indicating that its membership is weighted as 40% Fred, 60% George, and 0% Linda. Thus, object identifier $ID_1$ would be associated with a TDIO vector of names and strength relationships e.g., ($ID_1$ is 40% Fred, 60% George, 0% Linda). The association of object identifier $ID_1$ and the vector of cluster names and strength associations is stored in a non-transitory storage device for use, in a subsequent recurrent performance of the functions of the modules of the system of FIG. 28, as a previous association between TDIO names and object identifiers for input to the main fuzzy clustering module.

It will be appreciated that the IDB server includes one or more processors 3202 that may be programmed according to program instructions 3224 to cause TDIO names assigned to the fuzzy clusters to become keys in relationship tables within the database. So, for example, there may be a relationship table with an entry like (George, $ID_1$, 0.6), etc. between these TDIOs and their member object identifiers. There also may be a relationship table, for example, between the TDIOs themselves with entries like (Fred, George, <score>), where here a typical choice for the <score> would be to take the vector dot product of the two membership vectors for Fred and George. This relationship score typically is populated in a relationship table relating pairs of objects at the same hierarchical level of organization, for instance in a User-User relationship table. It is noted that the example implementation discloses scoring as happening after the TDIO naming procedure, that is not necessary. Another example scoring module can perform the scoring operation in the same place as the association scoring" operation described above in relation to FIG. 23. Relationship scores can be obtained for object identifiers at the same or differing levels in the hierarchy.

Figure 29:
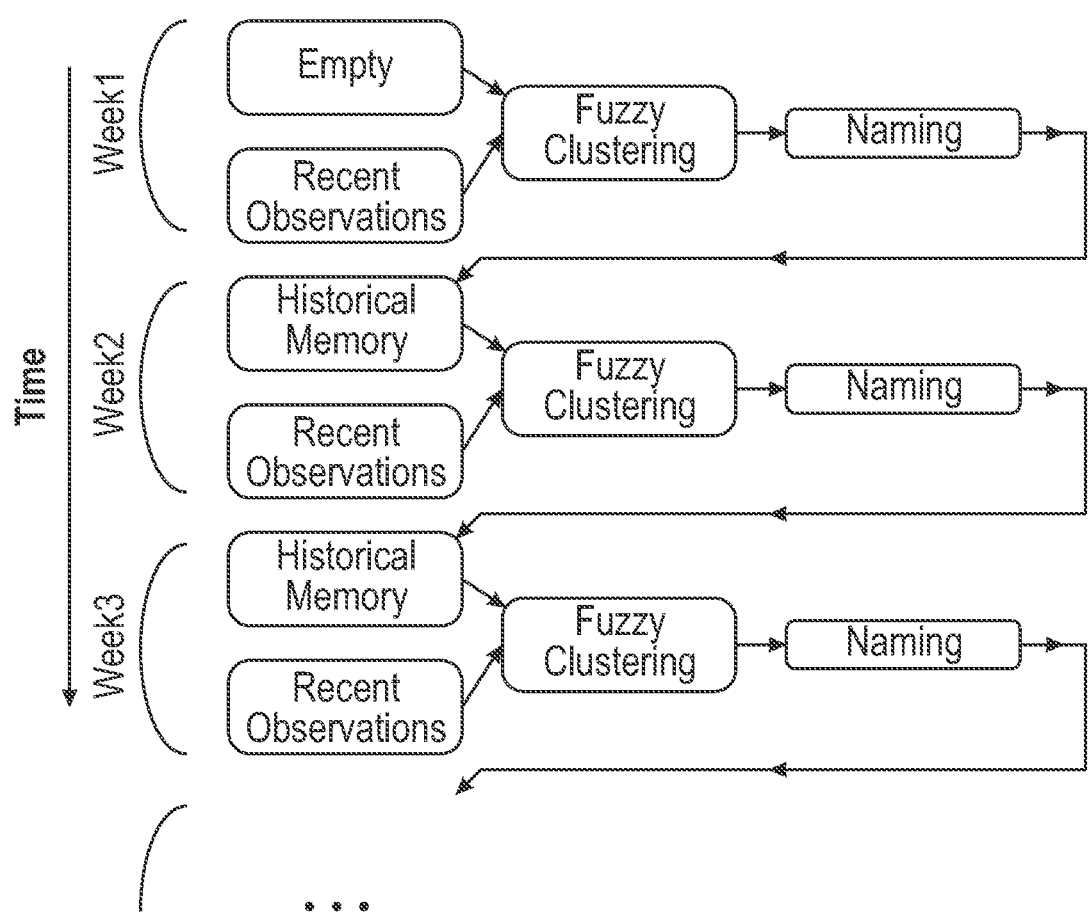
FIG. 29 is an illustrative example system level diagram representing configuration of the IDB server to recursively create fuzzy clusters of object identifiers and to score relationship strengths of object identifiers to the fuzzy clusters at a sequence of time intervals.

FIG. 29 is an illustrative example system level diagram representing configuration of one or more processors 3202 of the IDB server 3200 according to program instructions 3224 to recursively create fuzzy clusters of object identifiers and to score relationship strengths of object identifiers to the fuzzy clusters at a sequence of time intervals e.g., over the course of multiple weeks. After the first time interval, e.g., at Week 3, previous associations between TDIO names and object identifiers that were stored during a previous time interval, e.g., at Week 2, and recent observations from the current time interval, e.g., Week 3, are received as input to a main fuzzy clustering module, which produces fuzzy clusters of object identifiers as described above with reference to FIG. 28. A TDIO determination module determines unique TDIO names to associate with TDIOs and with their member object identifiers. In the illustrative example, a first fuzzy clustering and relationship scoring at Week 1, starts with empty previous associations between TDIO names and object identifiers. Thus, it will be appreciated that current TDIO names may be built up and evolve over time based upon previous TDIO names and current observations.

Figure 30:
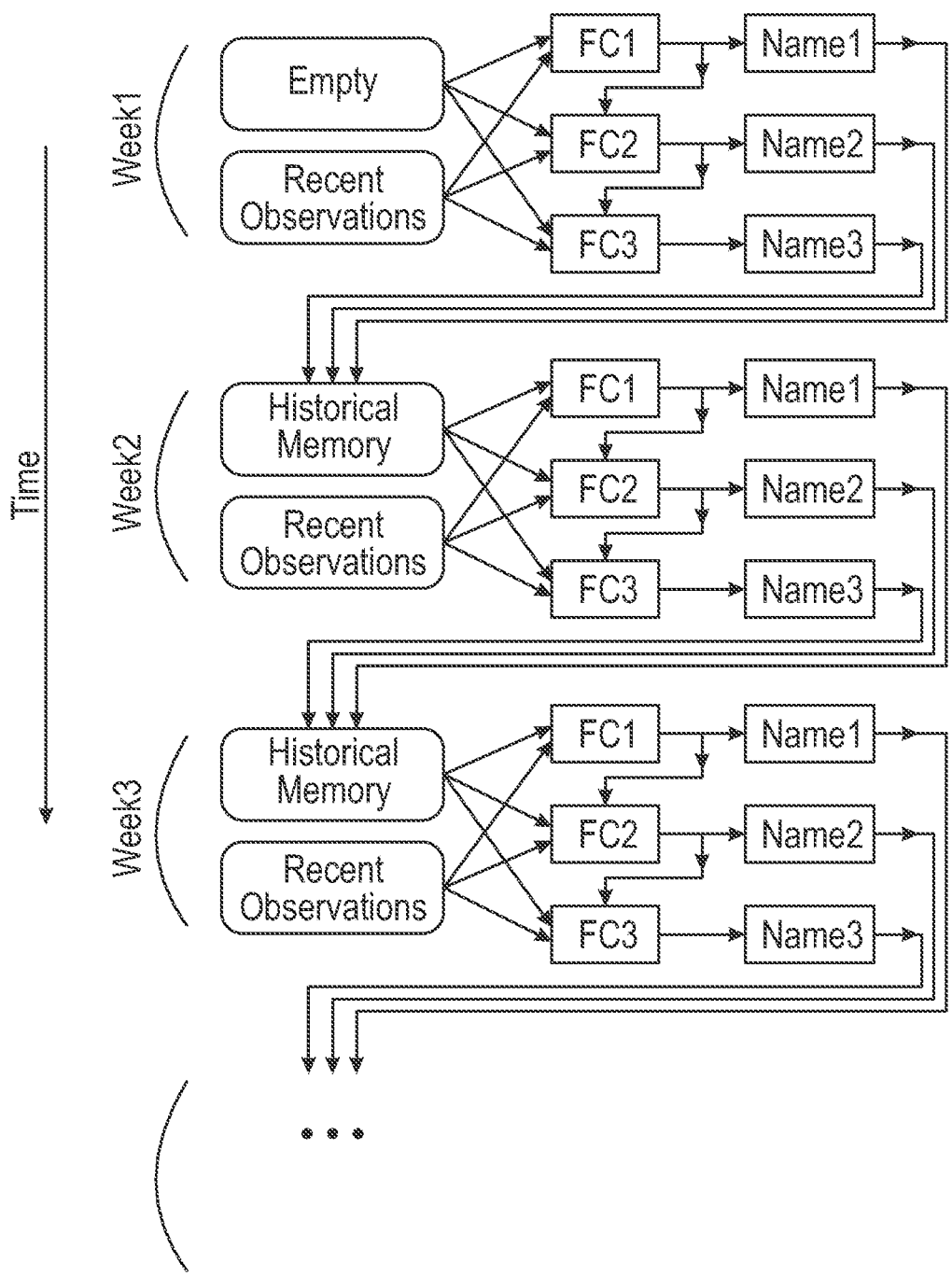
FIG. 30 is an illustrative drawing system level diagram representing configuration of the IDB server to recursively create a hierarchy of object identifiers and to score relationship strengths of object identifiers to the fuzzy clusters at a sequence of time intervals.

FIG. 30 is an illustrative drawing system level diagram representing configuration of one or more processors 3202 of the IDB server 3200 according to program instructions 3224 to recursively create a hierarchy of object identifiers and to score relationship strengths of object identifiers to the fuzzy clusters at a sequence of time intervals e.g., over the course of multiple weeks. The IDB server 3200 is configured to recursively perform a fuzzy clustering and object identifier to cluster relationship scoring at multiple hierarchical levels of TDIO resolution at a sequence of time intervals. A first fuzzy clustering module (FC1) performs fuzzy clustering at hierarchy level 1. A second fuzzy clustering module (FC2) performs fuzzy clustering at hierarchy level 2. A second fuzzy clustering module (FC3) performs fuzzy clustering at hierarchy level 3. The function and structure of the FC1, FC2, and FC3 modules correspond to the main fuzzy clustering module of FIG. 28. A first TDIO determination module (Name1) produces TDIO names for clusters produced by FC1. A second TDIO determination module (Name2) produces TDIO names for clusters produced by FC2. A third TDIO determination module (Name3) produces TDIO names for clusters produced by FC3. The function and structure of the Name1, Name2, and Name3 modules correspond to the TDIO determination module of FIG. 28. Cluster hierarchy level 1 may include TDIOs that represent devices in which each level 1 TDIO is a cluster of device IDs. Cluster hierarchy level 2 may include TDIOs that represent users in which each level 2 (user) TDIO is a cluster of level 1 (device) TDIOs. Cluster hierarchy level 3 may include TDIOs that represent households in which each level 3 (household) TDIO is a cluster of level 2 (user) TDIOs. Thus, process produces an evolving hierarchy of TDIOs.

Level 3 TDIOs are built from level2 TDIOs, and the level2 TDIOs are built from level 1 TDIOs. The process also produces an evolving collection of TDIO names to name the TDIOs of the hierarchy. At each time interval, the FC1 module, FC2 module and FC3 module receive previous associations of TDIO names and object identifiers from one or more of the three hierarchical clustering levels ((level 1, level 2, level 3). Similarly, at each time interval, the FC1 module, FC2 module and FC3 module current network data observations for one or more of the three hierarchical clustering levels ((level 1, level 2, level 3).

An example FCX module can use TDIO names from all levels (TDIOs were created in a previous week and are available wherever they may be deemed helpful in a current week). An example FCX module typically ties observations (properly associated with) the lowest level identifiers themselves (i.e., cookies). Generally, there are not, for example, "User observations" per se, except to say that once we infer the users from their constituent member devices (which are constructed of identifiers). An example FCX module can take the identifier level observations, along with the known device-level organization and known user-level organization to build up user-level observations (the user-user score is some learned function of the id-id score for the underlying identifiers). An example FCX module can to use observations from various levels to construct inferred objects at various different hierarchy levels.

In some examples, after a previous time interval's run (e.g., after a week's run) the base (non-inferred) identifiers can be named with all levels of TDIO names, so in week K a particular cookie would have names such as ("iPhone_1234", "John", "John's_Household"). In the week K+1 clustering all three of these names are available as part of the useable historical information at all levels (so if you're making first-level clusters you can still use the second and third level previous week's TDIO names for the objects you are clustering, they are fair game). Thus, TDIOs from all levels feed into the next time interval's clustering at all levels.

IDB Server Hardware

FIG. 31 is a block diagram illustrating components of a machine 3200, according to some example embodiments, able to read instructions 3224 from a machine-readable medium 3222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 31 shows the machine 3200 in the example form of a computer system (e.g., a computer) within which the instructions 3224 (e.g., software, a program, an application, an applet, an app, or other executable code) for causing the machine 3200 to perform any one or more of the methodologies discussed herein may be executed, in whole or in part.

In alternative embodiments, the machine 3200 operates as a standalone device or may be communicatively coupled (e.g., networked) to other machines. In a networked deployment, the machine 3200 may operate in the capacity of a server machine or a client machine in a server-client network environment, or as a peer machine in a distributed (e.g., peer-to-peer) network environment. The machine 3200 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 3224, sequentially or otherwise, that specify actions to be taken by that machine. Further, while only a single machine is illustrated, the term "machine" shall also be taken to include any collection of machines that individually or jointly execute the instructions 3224 to perform all or part of any one or more of the methodologies discussed herein.

The machine 3200 includes a processor 3202 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 3204, and a static memory 3206, which are configured to communicate with each other via a bus 3208. The processor 3202 contains solid-state digital microcircuits (e.g., electronic, optical, or both) that are configurable, temporarily or permanently, by some or all of the instructions 3224 such that the processor 3202 is configurable to perform any one or more of the methodologies described herein, in whole or in part. For example, a set of one or more microcircuits of the processor 3202 may be configurable to execute one or more modules (e.g., software modules) described herein. In some example embodiments, the processor 3202 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 3200 with at least the processor 3202, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 3200 may further include a graphics display 3210 (e.g., a plasma display panel (PDP), a light emitting diode (LED) display, a liquid crystal display (LCD), a projector, a cathode ray tube (CRT), or any other display capable of displaying graphics or video). The machine 3200 may also include an alphanumeric input device 3212 (e.g., a keyboard or keypad), a pointer input device 3214 (e.g., a mouse, a touchpad, a touchscreen, a trackball, a joystick, a stylus, a motion sensor, an eye tracking device, a data glove, or other pointing instrument), a data storage 3216, an audio generation device 3218 (e.g., a sound card, an amplifier, a speaker, a headphone jack, or any suitable combination thereof), and a network interface device 3220.

The data storage 3216 (e.g., a data storage device) includes the machine-readable medium 3222 (e.g., a tangible and non-transitory machine-readable storage medium) on which are stored the instructions 3224 embodying any one or more of the methodologies or functions described herein. The instructions 3224 may also reside, completely or at least partially, within the main memory 3204, within the static memory 3206, within the processor 3202 (e.g., within the processor's cache memory), or any suitable combination thereof, before or during execution thereof by the machine 3200. Accordingly, the main memory 3204, the static memory 3206, and the processor 1002 may be considered machine-readable media (e.g., tangible and non-transitory machine-readable media). The instructions 3224 may be transmitted or received over the network 3290 via the network interface device 3220. For example, the network interface device 3220 may communicate the instructions

3224 using any one or more transfer protocols (e.g., hypertext transfer protocol (HTTP)).

In some example embodiments, the machine 3200 may be a portable computing device (e.g., a smart phone, a tablet computer, or a wearable device), and may have one or more additional input components 3230 (e.g., sensors or gauges). Examples of such input components 3230 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 3230 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 3222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 3224 for execution by the machine 3200, such that the instructions 1024, when executed by one or more processors of the machine 3200 (e.g., processor 3202), cause the machine 3200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 3224 for execution by the machine 3200 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 3224).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The foregoing description and drawings of embodiments are merely illustrative of the principles of the invention. Various modifications can be made to the embodiments by those skilled in the art without departing from the spirit and scope of the invention, which is set forth in the appended claims.

The invention claimed is:

1. A method to stably manage dynamically changing object identity relationships in a data storage system, comprising:

storing in a one or more computer readable storage devices, at least one logical table that includes a logical key field column that includes as keys, temporally distributed inferred object (TDIO) names, and that includes multiple logical rows, wherein each logical row includes a key name and one or more object identifiers (OIDs);

storing in the one or more computer readable storage devices, respective name associations that associate respective OIDs with respective TDIO names;

using one or more processors during each of multiple time intervals of a sequence of respective time intervals to perform acts including:

producing a respective graph structure, in the one or more computer readable storage devices, that includes OIDs that act as vertices;

producing a plurality of clusters of OIDs, in the one or more computer readable storage devices, based upon the respective graph structure;

assigning a respective first cluster with one of a respective first new unique TDIO name and a respective pre-existing TDIO name associated within the name associations with an OID included within the respective first cluster;

in response to assigning the respective first new unique TDIO name to the respective first cluster, adding a new key to the logical key field column of a first logical table having a key name that matches the respective first new unique name assigned to the respective first cluster and populating OIDs included within the respective first cluster into a logical row of the first logical table corresponding to the added new key; and in response to assigning the respective pre-existing TDIO name to the respective first cluster, populating OIDs included within the respective first cluster into a logical row of the first logical table including a pre-existing key name matching the respective pre-existing TDIO name assigned to the respective first cluster.

2. The method of claim 1,
wherein producing the respective graph structure includes discovering OID pairs over a network and scoring the discovered OID pairs to weight edges between vertices of the respective graph structure.

3. The method of claim 1 further including using the one or more processors to perform acts including:
determining whether at least one other OID included within the first cluster lacks an association with a TDIO name, within the respective name associations;
in response to a determination that at least one other OLD included within the first cluster lacks an association with a TDIO name, providing an association within the respective name associations between the at least one other OID and the assigned TDIO name.

4. The method of claim 1 further including using the one or more processors to perform acts including:
determining whether at least one other OID included within the first cluster has an association, within the name associations, with a TDIO name that does not match the assigned TDIO name; and
in response to a determination that the at least one other OID included within the first cluster has an association with a TDIO name that does not match the assigned TDIO name, changing the association of the at least one other OID, within the name associations, to an association with the assigned TDIO name.

5. The method of claim 1 further including using the one or more processors to perform acts including:
determining whether there exists a respective OID included within the respective first cluster that is associated, within a respective name association, with a pre-existing TDIO name;
wherein assigning includes,
in response to a determination that there is no OID included within the respective first cluster that is associated with a pre-existing TDIO name, assigning the respective first new unique TDIO name to the respective first cluster.

6. The method of claim 1 further including using the one or more processors to perform acts including:
determining whether there exists a respective second cluster that is associated with the respective pre-existing TDIO name associated within the name associations with the OID included within the respective first cluster; and
wherein assigning includes,
in response to a determination that there exists the respective second cluster that is associated with the respective pre-existing TDIO name, assigning the respective first new unique TDIO name to the respective first cluster; and
in response to a determination that there does not exist the respective second cluster that is associated with the respective pre-existing TDIO name, assigning the respective pre-existing TDIO name to the respective first cluster.

7. The method of claim 1 further including using the one or more processors to perform acts including:
determining whether there exists a respective second cluster, larger than the respective first cluster, that is associated with the respective pre-existing TDIO name associated within the name associations with the OID included within the respective first cluster; and
wherein assigning includes,
in response to a determination that there exists the respective second cluster, larger than the first cluster, that is associated with the respective pre-existing TDIO name, assigning the respective first new unique TDIO name to the respective first cluster; and
in response to a determination that there does not exist the respective second cluster, larger than the respective first cluster, that is associated with the respective pre-existing TDIO name, assigning the respective pre-existing TDIO name to the respective first cluster.

8. The method of claim 1 further including using the one or more processors to perform acts including:
determining one or more relationship scores indicative of strength of relationship between the respective first cluster and the respective OIDs included within the respective first cluster; and
populating the determined one or more relationship scores into the logical row of the first logical table that includes the key name matching the respective TDIO name assigned to the respective first cluster.

9. The method of claim 8,
wherein determining the one or more relationship scores includes determining pairwise relationship scores.

10. The method of claim 8,
wherein determining the one or more relationship scores includes determining cluster membership level relationship scores.

11. The method of claim 8,
wherein determining the one or more relationship scores includes determining graph path length-based relationship scores.

12. The method of claim 8,
wherein a respective OID is included within the first respective cluster and within a second respective cluster, further including using the one or more processors to perform acts including:
determining at least one first relationship score indicative of strength of relationship between the respective first cluster and the respective OID;
determining at least one second relationship score indicative of strength of relationship between the respective second cluster and the respective OID;
populating at least one of the determined first and second relationship scores into the logical row of the first logical table that includes the key name matching the respective TDIO name assigned to the respective first cluster;
populating at least one of the determined first and second relationship scores into a logical row of a second logical table that includes a key name matching a respective TDIO name assigned to the respective second cluster.

13. A data storage system configured to stably manage dynamically changing object identity relationships, composing:
one or more processors processor and one or more non-transitory computer readable storage devices operably coupled thereto, the non-transitory computer readable storage devices comprising:
at least one logical table that includes a logical key field column that includes as keys, temporally distributed inferred object (TDIO) names, and that includes multiple logical rows, wherein each logical row includes a key name and one or more object identifiers (OIDs);
respective name associations that associate respective OIDs with respective TDIO names; and a plurality of instructions stored in association with the one or more non-transitory storage devices, that are accessible to, and executable by, the processor, where the plurality of instructions comprises:

instructions that, when executed, produce a respective graph structure, in the one or more computer readable storage devices, that includes OIDs that act as vertices;

instructions that, when executed, produce a plurality of clusters of OIDs, in the one or more computer readable storage devices, based upon the respective graph structure;

instructions that, when executed, assign a respective first cluster with one of a respective first new unique TDIO name and a respective pre-existing TDIO name associated within the name associations with an OID included within the respective first cluster;

instructions that, when executed, in response to assigning the respective first new unique TDIO name to the respective first cluster, add a new key to the logical key field column of a first logical table having a key name that matches the respective first new unique name assigned to the respective first cluster and populate OIDs included within the respective first cluster into a logical row of the first logical table corresponding to the added new key; and instructions that, when executed, in response to assigning the respective pre-existing TDIO name to the respective first cluster, populate OIDs included within the respective first cluster into a logical row of the first logical table including a pre-existing key name matching the respective pre-existing TDIO name assigned to the respective first cluster.

14. The data storage system of claim 13,
wherein producing the respective graph structure includes discovering OID pairs over a network and scoring the discovered OID pairs to weight edges between vertices of the respective graph structure.

15. The data storage system of claim 13 further including:
instructions that, when executed, determine whether at least one other OID included within the first duster lacks an association with a TDIO name, within the respective name associations;
instructions that, when executed, in response to a determination that at least one other OID included within the first cluster lacks an association with a TDIO name, provide an association within the respective name associations between the at least one other OID and the assigned TDIO name.

16. data storage system of claim 13 further including:
instructions that, when executed, determine whether at least one other OID included within the first cluster has an association, within the name associations, with a TDIO name that does not match the assigned TDIO name; and
instructions that, when executed, in response to a determination that the at least one other OID included within the first cluster has an association with a TDIO name that does not match the assigned TDIO name, change the association of the at least one other OID, within the name associations, to an association with the assigned TDIO name.

17. The data storage system of claim 13 further:
instructions that, when executed, determine whether there exists a respective OID included within the respective first cluster that is associated, within a respective name association, with a pre-existing TDIO name;
wherein assigning includes,
in response to a determination that there is no OID included within the respective first cluster that is associated with a pre-existing TDIO name, assigning the respective first new unique TDIO name to the respective first cluster.

18. The data storage of claim 13 further including:
instructions that, when executed, determine whether there exists a respective second cluster that is associated with the respective pre-existing TDIO name associated within the name associations with the OID included within the respective first cluster; and
wherein assigning includes,
in response to a determination that there exists the respective second cluster that is associated with the respective pre-existing TDIO name, assigning the respective first new unique TDIO name to the respective first cluster; and
in response to a determination that there does not exist the respective second cluster that is associated with the respective pre-existing TDIO name, assigning the respective pre-existing TDIO name to the respective first cluster.

19. The data storage system of claim 13 further including:
instructions that, when executed, determine whether there exists a respective second cluster, larger than the respective first cluster, that is associated with the respective pre-existing TDIO name associated within the name associations with the OID included within the respective first cluster; and
wherein assigning includes,
in response to a determination that there exists the respective second cluster, larger than the first cluster, that is associated with the respective pre-existing TDIO name, assigning the respective first new unique TDIO name to the respective first cluster; and
in response to a determination that there does not exist the respective second cluster, larger than the respective first cluster, that is associated with the respective pre-existing TDIO name, assigning the respective pre-existing TDIO name to the respective first cluster.

20. The data storage system of claim 13 further including:
instructions that, when executed, determine one or more relationship scores indicative of strength of relationship between the respective first cluster and the respective OIDs included within the respective first cluster; and
instructions that, when executed, populate the determined one or more relationship scores into the logical row of the first logical table that includes the key name matching the respective TDIO name assigned to the respective first cluster.

21. The data storage system of claim 20,
wherein determining the one or more relationship scores includes determining pairwise relationship scores.

22. The data storage system of claim 20,
wherein determining the one or more relationship scores includes determining cluster membership level relationship scores.

23. The data storage system of claim 20,
wherein determining the one or more relationship scores includes determining graph path length-based relationship scores.

24. The method of claim 20,
wherein a respective OID is included within the first respective cluster and within a second respective cluster, further including:

instructions that, when executed, determine at least one first relationship score indicative of strength of relationship between the respective first cluster and the respective OID;

instructions that, when executed, determine at least one second relationship score indicative of strength of relationship between the respective second cluster and the respective OID;

instructions that, when executed, populate at least one of the determined first and second relationship scores into the logical row of the first logical table that includes the key name matching the respective TDIO name assigned to the respective first cluster;

instructions that, when executed, populate at least one of the determined first and second relationship scores into a logical row of a second logical table that includes a key name matching a respective TDIO name assigned to the respective second cluster.

25. A non-transitory machine-readable storage medium including instructions that, when executed by a machine, cause the machine to perform operations comprising:

storing in a one or more computer readable storage devices, at least one logical table that includes a logical key field column that includes as keys, temporally distributed inferred object (TDIO) names, and that includes multiple logical rows, wherein each logical row includes a key name and one or more object identifiers (OIDs);

storing in the one or more computer readable storage devices, respective name associations that associate respective OIDs with respective TDIO names;

producing a respective graph structure, in the one or more computer readable storage devices, that includes OIDs that act as vertices;

producing a plurality of clusters of OIDs, in the one or more computer readable storage devices, based upon the respective graph structure;

assigning a respective first cluster with one of a respective first new unique TDIO name and a respective pre-existing TDIO name associated within the name associations with an OID included within the respective first cluster;

in response to assigning the respective first new unique TDIO name to the respective first cluster, adding a new key to the logical key field column of a first logical table having a key name that matches the respective first new unique name assigned to the respective first cluster and populating OIDs included within the respective first cluster into a logical row of the first logical table corresponding to the added new key; and in response to assigning the respective pre-existing TDIO name to the respective first cluster, populating OIDs included within the respective first cluster into a logical row of the first logical table including a pre-existing key name matching the respective pre-existing TDIO name assigned to the respective first cluster.

26. A data storage system configured to stably manage dynamically changing identity relationships, comprising:

a display screen;

one or more processors processor and one or more non-transitory computer readable storage devices operably coupled thereto, the non-transitory computer readable storage devices comprising:

at least one logical table that includes a logical key field column that includes as keys, temporally distributed inferred object (TDIO) names, and that includes multiple respective logical rows, wherein each respective logical row includes a respective TDIO name, one or more respective object identifiers (OIDs), and one or more relationship scores indicative of strength of relationship between the respective TDIO name and the respective OIDs included within the respective logical row; and a plurality of instructions stored in association therewith that are accessible to, and executable by, the processor, where the plurality of instructions comprises:

instructions that, when executed, display on the screen, a graphical user interface including an input to receive user selection of a strength of relationship range between one or more TDIOs and one or more OIDs included within the at least one logical table; and instructions that, when executed, in response to a user input to select the strength of relationship range, access the at least one logical table to display information indicative of one or more OIDs having a strength of relationship with the one or more TDIOs, within the user selected strength of relationship range.

27. The data storage system of claim 26, wherein the input includes a slider track.

* * * * *

UNITED STATES PATENT AND TRADEMARK OFFICE
CERTIFICATE OF CORRECTION

PATENT NO.       : 10,956,454 B2  
APPLICATION NO.  : 16/141229  
DATED            : March 23, 2021  
INVENTOR(S)      : Guan et al.

Page 1 of 1

It is certified that error appears in the above-identified patent and that said Letters Patent is hereby corrected as shown below:

In the Claims

In Column 39, Line 14, in Claim 3, delete "OLD" and insert --OID-- therefor

In Column 40, Lines 55-56, in Claim 13, delete "composing:" and insert --comprising:-- therefor In Column 41, Line 50, in Claim 16, before "data", insert --The--

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*